United States Patent
Kato

(10) Patent No.: US 9,746,699 B2
(45) Date of Patent: Aug. 29, 2017

(54) OPTICAL FREQUENCY SHIFTER, SINGLE SIDEBAND MODULATOR, AND LIGHT INSERTION AND BRANCH APPARATUS

(71) Applicant: FUJITSU LIMITED, Kawasaki-shi, Kanagawa (JP)

(72) Inventor: Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/069,077

(22) Filed: Mar. 14, 2016

(65) Prior Publication Data
US 2016/0306199 A1 Oct. 20, 2016

(30) Foreign Application Priority Data

Apr. 20, 2015 (JP) ................................. 2015-086240

(51) Int. Cl.
H04B 10/079 (2013.01)
G02F 1/01 (2006.01)
(Continued)

(52) U.S. Cl.
CPC ............ *G02F 1/011* (2013.01); *G02B 6/2766* (2013.01); *G02B 6/2861* (2013.01);
(Continued)

(58) Field of Classification Search
CPC combination set(s) only.
See application file for complete search history.

(56) References Cited

U.S. PATENT DOCUMENTS

2009/0208200 A1* 8/2009 Takasaka ............... G02F 2/002
398/1
2010/0014874 A1* 1/2010 Kawanishi ............. G02F 1/225
398/187
(Continued)

FOREIGN PATENT DOCUMENTS

| JP | 2002-62516 | 2/2002 |
| JP | 2007-333753 | 12/2007 |
| JP | 2010-187338 | 8/2010 |

OTHER PUBLICATIONS

"Development of optical Hilbert transformation by multiple light wave interference and optical single sideband modulation applied technology", *The Telecommunications Advancement Foundation (TAF)*, 07-01059, No. 24, pp. 290-296, 2009.

*Primary Examiner* — David Payne
*Assistant Examiner* — Omar S Ismail
(74) *Attorney, Agent, or Firm* — Staas & Halsey LLP

(57) ABSTRACT

An optical frequency shifter includes a splitter that branch a first optical signal having a first frequency component, a first mutual phase modulator that generate a second optical signal having a second frequency component and a third optical signal having a third frequency component with mutual phase modulation of the first optical signal and a first optical beat signal, a phase converter that change a phase of an output of the first mutual phase modulator, a second mutual phase modulator that generate the second optical signal and the third optical signal with mutual phase modulation of the first phase converter of output signal and a second optical beat signal, and a combiner that interfere between an output of the second mutual phase modulator and another optical signal obtained by branching of the splitter.

14 Claims, 14 Drawing Sheets

(51) Int. Cl.
 *H04B 10/516* (2013.01)
 *G02B 6/293* (2006.01)
 *G02B 6/28* (2006.01)
 *G02B 6/27* (2006.01)

(52) U.S. Cl.
 CPC ......... *G02B 6/2938* (2013.01); *H04B 10/079* (2013.01); *H04B 10/5165* (2013.01)

(56) References Cited

U.S. PATENT DOCUMENTS

2013/0208335 A1* 8/2013 Gottwald .................. G02F 1/01
 359/279
2014/0363159 A1* 12/2014 Chien .................. H04B 10/506
 398/43
2015/0071583 A1* 3/2015 Nishimoto ....... H04B 10/50572
 385/3
2015/0086200 A1* 3/2015 Xie .................... H04B 10/2581
 398/44

* cited by examiner

FIG. 3A
FIG. 3B
SOLID LINE: INTENSITY
DOTTED LINE: PHASE
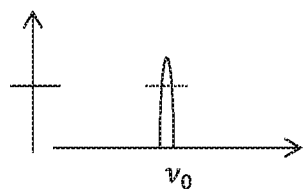
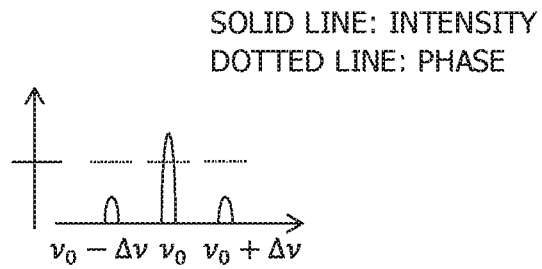
FIG. 3C
FIG. 3D
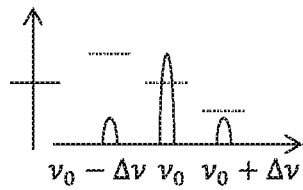
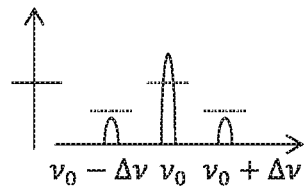
FIG. 3E
FIG. 3F
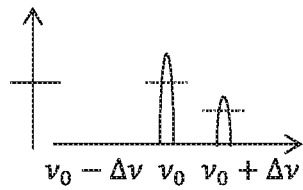
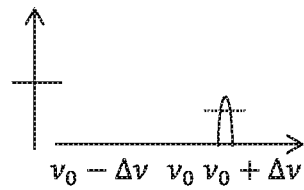

OPTICAL FREQUENCY SHIFTER, SINGLE SIDEBAND MODULATOR, AND LIGHT INSERTION AND BRANCH APPARATUS

CROSS-REFERENCE TO RELATED APPLICATION

This application is based upon and claims the benefit of priority of the prior Japanese Patent Application No. 2015-086240, filed on Apr. 20, 2015, the entire contents of which are incorporated herein by reference.

FIELD

The embodiments discussed herein are related to an optical frequency shifter, a single sideband modulator, and a light insertion and branch apparatus.

BACKGROUND

An optical frequency shifter does not perform photoelectric conversion on an input optical signal, but can shift a frequency (wavelength) of the optical signal itself. Thus, the optical frequency shifter is an important device in a wide range of fields such as an optical communication system and an optical measurement system.

The currently known optical frequency shifter uses single side band (SSB) modulation using an electro-optic phase modulator or a device using an acousto-optic effect.

In the method of using the acousto-optic effect, a diffraction phenomenon of light by a sound wave to be propagated is used. In this method, if light has a frequency which is in a high frequency region equal to or greater than 1 GHz, a wavelength of the sound wave is smaller than a wavelength of a light wave and diffraction does not occur. Thus, an upper limit of the frequency of the light is set to several hundred MHz.

In the SSB modulation using the electro-optic phase modulator, as illustrated in FIG. 14, an SSB modulator 1 is realized by combining a plurality of electric engineering phase modulators (low-frequency phase modulator 10, and high-frequency phase modulators 20*a* and 20*b*) and a Mach-Zehnder type optical waveguide circuit in many cases.

In Japanese Laid-open Patent Publication No. 2002-62516, one SSB modulation using an electro-optic phase modulator is provided and a modulation signal is only supplied from a single feeder circuit by using electric engineering crystals which form a polarization reversal structure, and thereby a frequency shift quantity of 1 GHz to 100 GHz is obtained.

SUMMARY

According to an aspect of the invention, an apparatus includes a splitter, a first mutual phase modulator, a phase converter, a second mutual phase modulator, and a combiner. The splitter configured to branch a first optical signal having a first frequency component. The first mutual phase modulator configured to generate a second optical signal having a second frequency component and a third optical signal having a third frequency component with mutual phase modulation of the first optical signal and a first optical beat signal having a desired frequency interval. The first phase converter configured to change a phase of an output of the first mutual phase modulator so as to be different from the second optical signal and the third optical signal. The second mutual phase modulator configured to generate the second optical signal and the third optical signal with mutual phase modulation of the first phase converter of output signal and a second optical beat signal having a desired frequency interval. The combiner configured to interfere between an output of the second mutual phase modulator and another optical signal obtained by branching of the splitter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A to 3F are diagrams illustrating intensity change and phase change in Embodiment 1;

DESCRIPTION OF EMBODIMENTS

In a WDM system, the frequency shift quantity equal to or greater than 100 GHz is desired for freely suppressing a carrier optical frequency of an optical signal in the C-band (1530 nm to 1565 nm) region which is used as a communication band. The frequency shift quantity becomes greater and thus it is desired to improve effective use of a multiple band and flexibility of a network. If the frequency shift quantity becomes greater, performance of the optical measurement system and the like can be also improved.

Considering such circumstances, an object of the embodiments is to provide an optical frequency shifter which can correspond to a frequency shift quantity of an optical signal obtained in a communication band.

Hereinafter, preferred embodiments of the disclosed technology will be described in detail with reference to the accompanying drawings.

Embodiment 1

Figure 1:
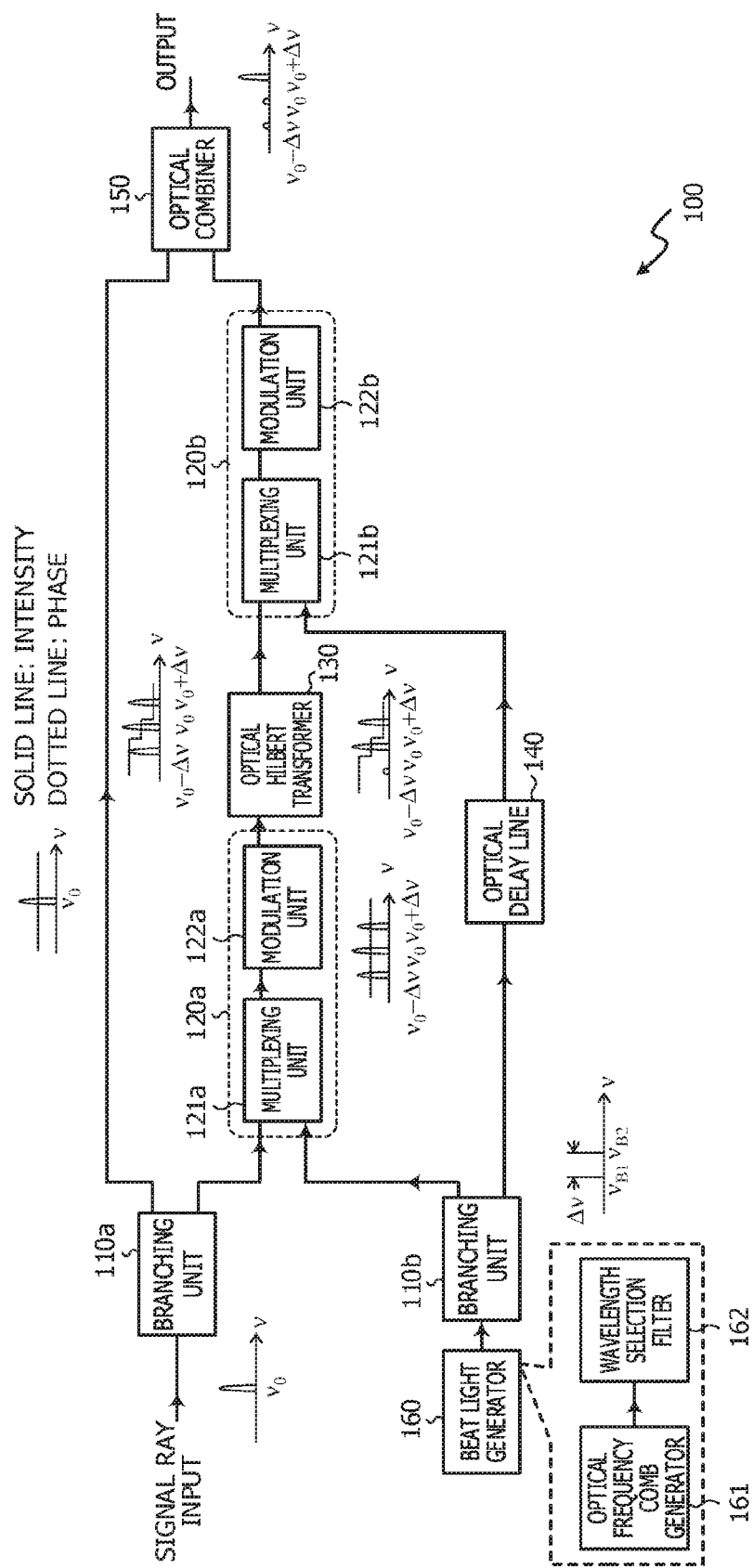
FIG. 1 is a diagram illustrating a configuration example of an optical frequency shifter according to Embodiment 1.

FIG. 1 illustrates a configuration diagram of Embodiment 1. An optical frequency shifter 100 according to Embodiment 1 includes branching units 110a and 110b, mutual phase modulators 120a and 120b, an optical Hilbert transformer 130, an optical delay line 140, an optical combiner 150, and a beat light generator 160. When the branching units 110a and 110b are not distinguished or the mutual phase modulators 120a and 120b are not distinguished, the branching units 110a and 110b are simply described as a branching unit 110 or the mutual phase modulators 120a and 120b are simply described as a mutual phase modulator 120. Regarding a signal status in the optical frequency shifter 100, intensity change is indicated by a solid line and phase change is indicated by a dotted line.

The optical Hilbert transformer 130 is used as an example in which phase change is differently applied to a case of setting a reference frequency to basically have a large value and a case of setting the reference frequency to basically have a small value. However, it is not limited thereto as long as phase change is differently applied to the case of setting the reference frequency is to basically have a large value and the case of setting the reference frequency to basically have a small value.

The branching unit 110 is configured by an optical splitter and the like, for example. The branching unit 110 branches an input optical signal.

The mutual phase modulator 120 includes a multiplexing unit 121 and a modulation unit 122. The multiplexing unit 121 includes a coupler and the like, for example, and performs multiplexing of the input optical signal and an optical beat signal. In a case of the mutual phase modulator 120a, the multiplexing unit 121a performs multiplexing of an input optical signal from the branching unit 110 and an optical beat signal. The modulation unit 122 has a nonlinear optical medium, and causes mutual phase modulation for a signal obtained by multiplexing of the multiplexing unit 121. For example, the modulation unit 122 corresponds to an optical fiber, a high-refractive index difference optical waveguide using silicon, and the like as a core, or a nonlinear optical medium such as a periodic polarization electrical engineering crystal.

The mutual phase modulation is a phenomenon in which phase modulation by using an optical control signal is applied to an optical signal when the optical signal and the optical control signal are incident to a nonlinear medium. Since a frequency is differentiation of the phase modulation, phase modulation having a linear slope is not performed on the optical signal and it is possible to realize generation of an optical signal subjected to optical frequency shift (wavelength conversion).

The optical Hilbert transformer 130 performs Hilbert transform by, for example, using optical fiber, fiber Bragg grating, an optical waveguide circuit, a wavelength dispersion medium such as VIPA, and a wavelength selection switch which enables phase control.

The Hilbert transform means transform that phase changes of $+\pi/2$ and $-\pi/2$ are respectively applied to a case where a frequency is greater than the reference frequency and a case where the frequency is smaller than the reference frequency.

When the Hilbert transform using the fiber is performed, it is possible to satisfy characteristics of the Hilbert transform by adjusting a length of the fiber.

The optical delay line 140 applies phase change to an optical signal by causing the optical signal to be delayed.

The optical combiner 150 performs interference between two input optical signals (an output of the mutual phase modulator 120b and the other signal of the branching unit 110a) and outputs a result of the interference. At this time, an original frequency component $v_0$ is removed by mutual interference between the two input signals.

For example, when original frequency components $v_0$ have the same phases, interference is performed so as to remove the same phase components by the optical combiner 150 (opposite phases are intensified).

Figure 2:
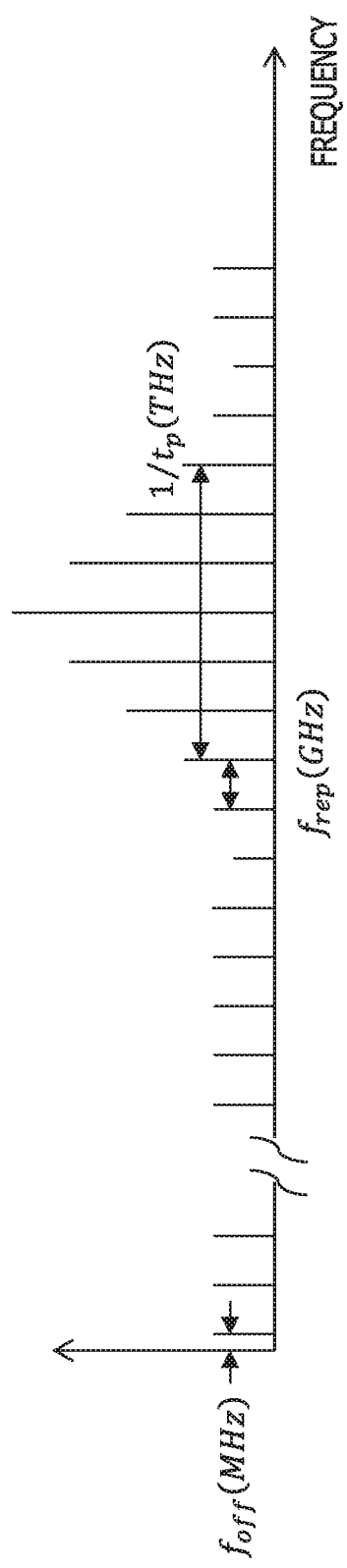
FIG. 2 is a diagram illustrating an example of an optical frequency comb transmitted from an optical frequency comb generator.

The beat light generator 160 includes an optical frequency comb generator 161 and a wavelength selection filter 162. The optical frequency comb generator 161 allows continuous generation of optical frequencies at an optical frequency interval (comb interval) $v$ based on an electric frequency source of a frequency $v$. The optical frequency comb is used for light which is output from an ultra-short pulse laser (mode synchronization laser) and has a comb-like spectrum of a wide band. The optical frequency comb is set as a sequence of multiple optical frequency modes which are arranged at an equal interval as illustrated in FIG. 2. The optical frequency comb as illustrated in FIG. 2 may have various criteria. Examples of the criteria for the optical frequency comb as illustrated in FIG. 2 include an optical frequency (sub PHz), a width of the spectrum $1/t_p$ (THz), a comb interval $f_{rep}$ (GHz), an offset frequency $f_{off}$ (which is equal to or smaller than MHz, and the like).

The wavelength selection filter 162 extracts two frequency components having a desired interval $\Delta v$. The wavelength selection filter 162 selects two frequency components having the frequency interval $\Delta v$ from an output having an optical frequency interval (comb interval) generated by the optical frequency comb generator 161, as illustrated in FIG. 2, and the beat light generator 160 generates an optical beat signal by using the two selected frequency components. The frequency interval of the optical beat signals is integer times a comb interval because the two frequency components are extracted by the wavelength selection filter 162. Thus, the beat light generator 160 may generate the optical beat signal at an interval of several THz. Since the optical beat signal is input to the mutual phase modulator 120a and the mutual phase modulator 120b, the branching unit 110b branches an output from the beat light generator 160.

The optical frequency of the optical beat signal is different from the original frequency component ($v_0$ in FIG. 1). Here, the optical frequency of the optical beat signal may be lower than the original frequency component or higher than the original frequency component. A difference between the original frequency component and the optical frequency of the optical beat signal is not particularly limited. However, if the difference between the original frequency component and the optical frequency of the optical beat signal is excessively small, separation of the original frequency component and the optical beat signal may be difficult. If the difference between the original frequency component and the optical frequency of the optical beat signal is excessively great, efficiency of the mutual phase modulation in the modulation unit 122 is degraded. Thus, the difference between the original frequency component and the optical frequency of the optical beat signal is preferably determined in consideration of these causes.

An operation and an action of Embodiment 1 will be described below in detail by using the phase change (dotted line) and the intensity change (solid line) in FIGS. 3A to 3F.

If an input optical signal (after branching of the branching unit) is set to be in a state of FIG. 3A, the input optical signal may be represented by the following expression.

$$E_0(t)=m_a(t)E_0\exp[j(2\pi v_0 t+m_p(t))] \quad \text{(Expression 1)}$$

$E_0$ indicates amplitude of an electric field. $v_0$ indicates an optical frequency. $m_a(t)$ indicates modulation of amplitude data and $m_p(t)$ indicate modulation of phase data.

When the mutual phase modulator 120a performs mutual phase modulation on the input optical signal $E_0(t)$ by using the optical beat signal having the optical frequency difference $\Delta v$, the state in FIG. 3B occurs and an optical signal $E_1(t)$ is as with the following expression.

$$E_1(t)=m_a(t)E_0\exp[j(2\pi v_0 t+m_p(t)+\eta_1\sin(2\pi v_0 t)+\phi_1)] \quad \text{(Expression 2)}$$

$\eta_1$ indicates efficiency of the mutual phase modulation in the mutual phase modulator 120a. $\phi_1$ indicates an initial phase of the optical beat signal used in the mutual phase modulation by the mutual phase modulator 120a. Here, if a primary Bessel function is used, Expression 2 is changed to Expression 3.

$$E_1(t)=m_a(t)E_0\exp[(2\pi v_0 t+m_p(t))]\Sigma_{n=-\infty}^{\infty}J_n(\eta_1)\exp[jn(2\pi\Delta vt+\emptyset_1)] \quad \text{(Expression 3)}$$

The primary Bessel function is represented as follows.

$$J_n(x) = \sum_{m=0}^{\infty} \frac{(-1)^m}{m!\Gamma(m+n+1)}\left(\frac{x}{2}\right)^{2m+1} \quad \text{(Expression 4)}$$

$\Gamma$ indicates gamma function. Here, regarding $\eta_1$, $\eta_1<1$ is set in order to obtain a linear effect. Since $J_1(\eta_1)>>J_2(\eta_1)>>J_3(\eta_1)$ ... is satisfied, Expression 4 may be approximate to the following expression.

$$E_1(t) = m_a(t)E_0\exp[(2\pi v_0 t + m_p(t))] \quad \text{(Expression 5)}$$

$$\sum_{n=-1}^{1} J_n(\eta_1)\exp[jn(2\pi\Delta vt + \emptyset_1)]$$

As features of the Bessel function, a relationship of the following expression is satisfied.

$$J_n(x)=(-1)^n J_{-n}(x) \quad \text{(Expression 6)}$$

Thus, the optical signal $E_1(t)$ output from the mutual phase modulator 120a is represented by the following expression obtained by using Expressions 5 and 6.

$$E_1(t)=m_a(t)E_0\exp(m_p(t))[\exp(2\pi v_0 t)+J_1(\eta_1)\exp[j2\pi(v_0+\Delta v)]-J_1(\eta_1)\exp[j2\pi(v_0-\Delta v)t-\phi_1]] \quad \text{(Expression 7)}$$

When the optical Hilbert transformer 130 performs Hilbert transform on the optical signal $E_1(t)$ which is subjected to phase modulation by the mutual phase modulator 120a, phase shift of $-\pi/2$ is applied to a frequency component $(v_0+\Delta v)$ which is greater than the reference frequency $v_0$, and phase shift of $\pi/2$ is applied to a frequency component $(v_0-\Delta v)$ which is smaller than the reference frequency $v_0$, the state of FIG. 3C occurs and the optical signal $E_1(t)$ is represented as with the following expression.

$$E'_1(t)=m_a(t)E_0\exp(m_p(t))[\exp(2\pi v_0 t)+J_1(\eta_1)\exp[j2\pi(v_0+\Delta v)t+(\phi_1-\pi/2)]-J_1(\eta_1)\exp[j(2\pi(v_0-\Delta v)t-(\phi_1+\pi/2))]] \quad \text{(Expression 8)}$$

If the mutual phase modulator 120b performs mutual phase modulation on the optical signal $E'_1(t)$ which is subjected to Hilbert transform, by using the optical beat signal having the optical frequency difference $\Delta v$, the optical signal $E_2(t)$ is represented by the following expression.

$$E_2(t)=m_a(t)E_0\exp(m_p(t))[\exp(2\pi v_0 t)+\exp(2\pi[j(v_0+\Delta v)t])[J_1(\eta_1)\exp[j(\phi_1-\pi/2)+J_1(\eta_2)\exp(j\phi_2)]-\exp(2\pi[j(v_0-\Delta v)t])[J_1(\eta_1)\exp[j(-\phi_1-\pi/2)+J_1(\eta_2)\exp(-j\phi_2)]] \quad \text{(Expression 9)}$$

Here, $\eta_2$ indicates efficiency of the mutual phase modulation in the mutual phase modulator 120b. $\phi_2$ indicates an initial phase of the optical beat signal used in the mutual phase modulation by the mutual phase modulator 120b.

In the mutual phase modulation by the mutual phase modulator 120b, the mutual phase modulation is also caused for the frequency component $(v_0+\Delta v)$ or the frequency component $(v_0-\Delta v)$. However, since the frequency component $(v_0+\Delta v)$ or the frequency component $(v_0-\Delta v)$ is approximate to the frequency component $(v_0)$ in order to have a small influence, the above expressions are also similarly applied to a case where the mutual phase modulation is performed only on the frequency component $(v_0)$.

When mutual phase modulation is performed in a state where the optical delay line 140 is applied to the original frequency component and the phase change (in a case of FIG. 3D, phase change of $-\pi/2$) is applied to the optical beat signal, a state as in FIG. 3D occurs.

The optical signal $E_2(t)$ output from the mutual phase modulator 120b is output in a state where FIG. 3C after Hilbert transform and FIG. 3D after the mutual phase modulation by the mutual phase modulator 120b are satisfied.

If efficiency of the mutual phase modulation of the mutual phase modulators 120a and 120b is set to satisfy $\eta=\eta_1=\eta_2$ the same, and a relationship between the initial phases of an optical beat signal used in first mutual phase modulation and an optical beat signal used in second mutual phase modulation is set to satisfy $\phi_2=\phi_1+\pi/2$, Expression 10 is obtained and an upper sideband is suppressed.

$$E_2(t)=m_a(t)E_0\exp(m_p(t))[\exp(2\pi v_0 t)-2J_1(\eta_1)\exp[j(2\pi(v_0-\Delta v)t-\phi_2)]] \quad \text{(Expression 10)}$$

If a relationship of $\phi_2=\phi_1-\pi/2$ is satisfied, the optical signal $E_2$ is output in a state of satisfying the state of FIG. 3C and the state of FIG. 3D, and thus the optical signal $E_2$ has a state of FIG. 3E.

$$E_2(t)=m_a(t)E_0\exp(m_p(t))[\exp(2\pi v_0 t)+2J_1(\eta_1)\exp[j(2\pi(v_0+\Delta v)t+\phi_2)]] \quad \text{(Expression 11)}$$

Thus, a lower sideband is suppressed.

The optical signal which is subjected to mutual phase modulation by the mutual phase modulator 120b and the other optical signal (original optical signal) obtained by branching of the branching unit are caused to interfere with each other so as to remove an original frequency component. Thus, an optical signal having only a lower sideband or only an upper sideband is output. For example, in a case of FIG. 3A (original optical signal) and FIG. 3E (optical signal subjected to mutual phase modulation by the mutual phase modulator 120b), the signals interfere with each other so as to remove the same phases.

$$E_3(t)=-2J_1(\eta_1)m_a(t)E_0[\exp[j(2\pi(v_0-\Delta v)t+(m_p(t)-\phi_2)]] \quad \text{(Expression 12)}$$

$$E_3(t)=2J_1(\eta_1)m_a(t)E_0[\exp[j(2\pi(v_0+\Delta v)t+(m_p(t)+\phi_2)]] \quad \text{(Expression 13)}$$

According to the above descriptions, an optical signal obtained by applying optical frequency shift of $+\Delta v$ or $-\Delta v$ to the frequency component $v_0$ of the original optical signal is realized.

For example, the state of Expression 13 is the state of FIG. 3F. A relationship of $\phi_2$ and $\phi_1$ may be adjusted by the optical delay line 140.

A case where transformation is performed by using wavelength dispersion for a change in the optical Hilbert transformer 130 of FIG. 1 is described in the following descriptions. A photoelectric field after passing through a wavelength dispersion medium having a propagation coefficient 3 and a length L satisfies the following expression.

$$E'(t)=E(t)\exp(j\beta(v)L) \quad \text{(Expression 14)}$$

Taylor series expansion in the vicinity of the frequency $v_0$ is as follows.

$$\beta(v)=\beta_0+2\pi\beta_1(v-v_0)+2\pi\beta_2(v-v_0)^2+ \quad \text{(Expression 15)}$$

Here, $\beta_m=(d^m\beta/dv^m)_{v=v_0}$ may be represented. (Expression 16)

When a band (bandwidth) is sufficiently smaller than the optical frequency difference $\Delta v$ (optical frequency interval of the optical beat signal), different group delays are respectively applied to the items of Expression 7, and thus the following expression is represented. Phase conversion is realized in the front and rear of the reference frequency by applying the group delay.

$$E'_1(t)=m_a(t)E_0\exp(jm_p(t))[\exp(2\pi v_0 t+\beta_0 L)+J_1(\eta_1)\exp(j[2\pi(v_0+\Delta v)t+(\phi_1-(\beta_0+2\pi\beta_1\Delta v+2\pi^2\beta_2\Delta v^2)L)])-J_1(\eta_1)\exp[j(2\pi(v_0-\Delta v)t-(\phi_1+(\beta_0-2\pi\beta_1\Delta v+2\pi^2\beta_2\Delta v^2)L)])] \quad \text{(Expression 17)}$$

The mutual phase modulator 120b performs mutual phase modulation on the optical signal $E'_1(t)$ obtained by passing through the wavelength dispersion medium so as to perform conversion, by using the optical beat signal having the optical frequency difference $\Delta v$, and thereby an optical signal $E_2(t)$ is obtained. The optical signal $E_2(t)$ is represented by the following expression.

$$E_2(t)=m_a(t)E_0\exp(jm_p(t)+j\beta_0 L)[\exp(J(2\pi v_0 t))+\exp(j^{2}\pi(v_0+\Delta v)t)][+J_1(\eta_1)\exp(j/\phi_1-(2\pi\beta_1\Delta v+2\pi^2\beta_2\Delta v^2)L/+J_1(\eta_2)\exp(j\phi_2)])-\exp(j/2\pi(v_0-\Delta v)t)[J_1(\eta_1)\exp(j/-\phi_1-(-2\pi\beta_1\Delta v+2\pi^2\beta_2\Delta v^2)L])+J_1(\eta_2)\exp(-j\phi_2)]] \quad \text{(Expression 18)}$$

When efficiency of the mutual phase modulation is set to satisfy ($\eta=\eta_1=\eta_2$) the same and expressions of $\phi_2=\phi_1+(-2\pi\beta_1\Delta v+2\pi^2\beta_2\Delta v^2)L$ and $2\pi^2\beta_2\Delta v^2 L=-\pi/2+2n\pi$ (where, n is integer) are satisfied, the following expression is obtained and the upper sideband is suppressed.

$$E_2(t)=m_a(t)E_0\exp(jm_p(t))\exp(j(2\pi v_0 t+j\beta_0 L))[1-2J_1(\eta_1)\exp(j/2\pi\Delta vt-\phi_2])] \quad \text{(Expression 19)}$$

When the expressions of $\phi_2=\phi_1-(2\pi\beta_1\Delta v+2\pi^2\beta_2\Delta v^2)L$ and $2\pi^2\beta_2\Delta v^2 L=\pi/2+2n\pi$ (where, n is integer) are satisfied, the following expression is obtained and the lower sideband is suppressed.

$$E_2(t)=m_a(t)E_0\exp(jm_p(t))\exp(j(2\pi v_0 t+j\beta_0 L))[1+2J_1(\eta_1)\exp(j/2\pi\Delta vt+\phi_2])] \quad \text{(Expression 20)}$$

At last, the optical combiner 150 causes the optical signal subjected to mutual phase modulation by the mutual phase modulator 120b and the other optical signal (original optical signal) obtained by branching of the branching unit 110a to interfere with each other. Thus, similarly to Expression 12, an optical signal having only a lower sideband or only an upper sideband is output.

As described above, optical frequency shift is realized by using wavelength dispersion.

The optimum dispersion value which allows the lower sideband to be suppressed in Expression 20, and has the smallest degree satisfies an expression of $2\pi^2\beta_2\Delta v^2 L=\pi/2$ or $2\pi^2\beta_2\Delta v^2 L=-3\pi/2$. Wavelength dispersion for the entirety of a transmission path at this time may be represented as follows by using a wavelength dispersion constant D ($=-2\pi c\beta_2/\lambda_0^2$), a wavelength $\lambda_0(=c/v_0)$ of the original frequency component, and the velocity c of light.

$$DL_{opt}=c/2\lambda_0^2\Delta v^2 \text{ or } DL_{opt}=-3c/2\lambda_0^2\Delta v^2 \quad \text{(Expression 21)}$$

The optimum dispersion value which allows the upper sideband to be suppressed in Expression 19, and has the smallest degree satisfies an expression of $2\pi^2\beta_2\Delta v^2 L=-\pi/2$ or $2\pi^2\beta_2\Delta v^2 L=3\pi/2$. Wavelength dispersion for the entirety of a transmission path at this time may be represented as follows by using a wavelength dispersion constant D ($=-2\pi c\beta_2/\lambda_0^2$), a wavelength $\lambda_0$ ($=c/v_0$) of the original frequency component, and the velocity c of light.

$$DL_{opt}=-c/2\lambda_0^2\Delta v^2 \text{ or } DL_{opt}=3c/2\lambda_0^2\Delta v^2 \quad \text{(Expression 22)}$$

From the above descriptions, Hilbert transform is set by using the dispersion value corresponding to frequency deviation which is sufficiently smaller than the optical frequency difference $\Delta v_0$.

With the above descriptions, the optical frequency shift may be performed by using the optical beat signal. Thus, an optical beat signal of several THz is generated by using an interval which is an integer times the optical frequency interval (comb interval), and thus phase shift of several THz may be performed.

Since shift of the frequency interval of the optical beat signal from the input optical signal is performed by using the optical beat signal, the optical frequency shift can be performed with high accuracy.

In FIG. 1, phase change is applied to a signal subjected to mutual phase modulation, by the Hilbert transform. However, it is not limited thereto, and phase change may be applied by using a positive frequency component and a negative frequency component of the reference frequency, as described in the method using wavelength dispersion.

Embodiment 2

Figure 4:
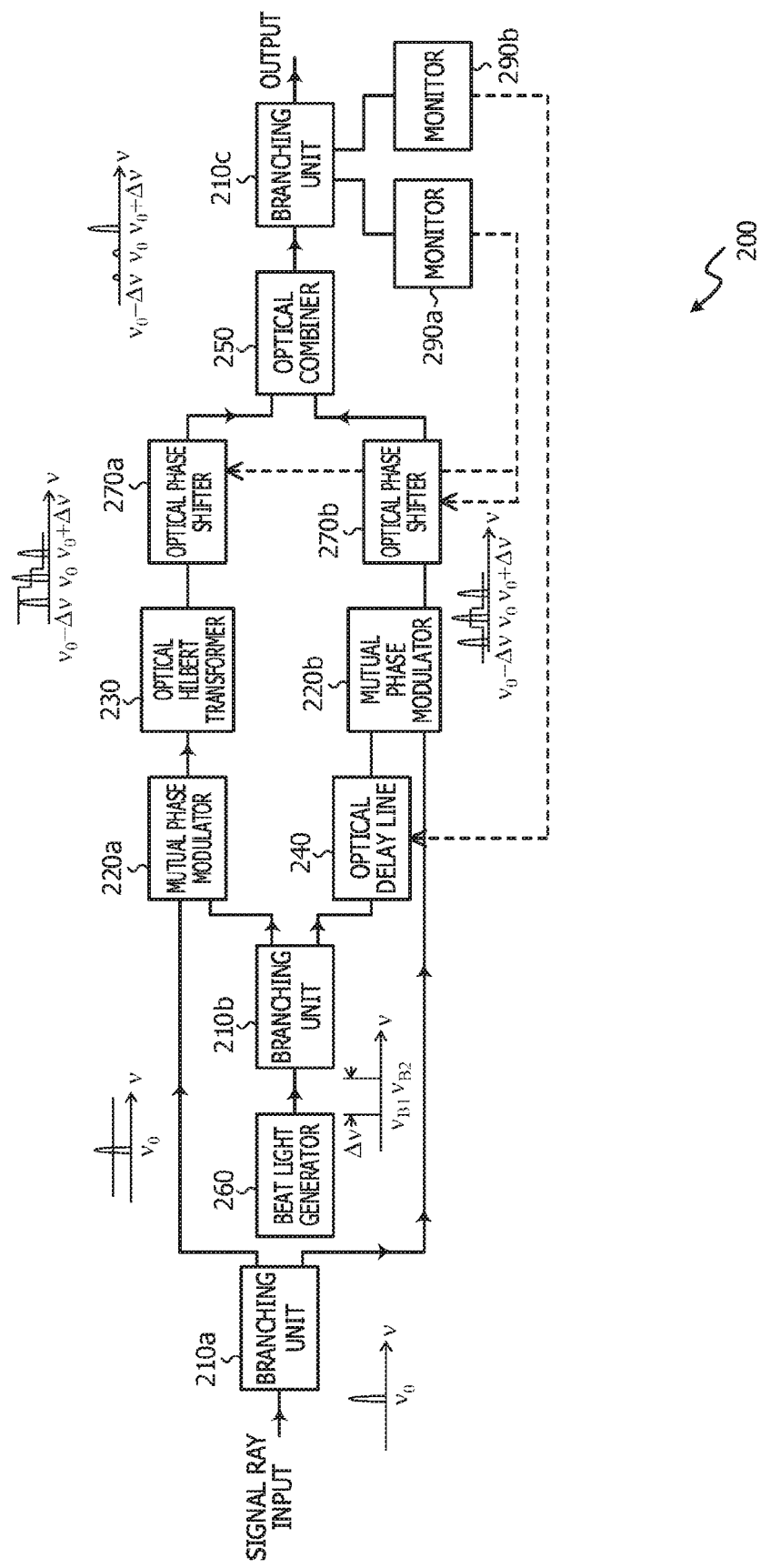
FIG. 4 is a diagram illustrating a configuration example of an optical frequency shifter according to Embodiment 2.

FIG. 4 illustrates a configuration diagram of an optical frequency shifter 200 according to Embodiment 2. The optical frequency shifter 200 includes branching units 210a, 210b, and 210c, mutual phase modulators 220a and 220b, an optical Hilbert transformer 230, an optical delay line 240, an optical combiner 250, a beat light generator 260, optical phase shifters 270a and 270b, and monitors 290a and 290b. When distinction is not desired, descriptions are simply made by using only numbers (for example, optical combiner 250).

The branching units 210, the mutual phase modulators 220, the optical Hilbert transformer 230, the optical delay line 240, the optical combiner 250, and the beat light generator 260 are respectively similar to those in Embodiment 1.

The optical phase shifter 270 adjusts a phase of an input optical signal.

The monitor 290 monitors a signal ahead of being output and obtains output information. The monitor 290 performs notification for the obtained information.

In Embodiment 2, the branching unit 210a performs branching. Signals obtained by branching of the branching unit 210a are respectively subjected to mutual phase modulation by the mutual phase modulator 220. The optical Hilbert transformer 230 performs the Hilbert transform on one signal. The optical phase shifter 270 adjusts outputs of the mutual phase modulator 220 and the optical Hilbert transformer 230 and then the optical combiner 250 performs multiplexing by interference between the adjusted outputs.

In phase adjustment performed by the optical phase shifter 270, the phase is adjusted by performing interference so as to remove the original frequency component $v_0$ when the optical combiner 250 performs multiplexing. At this time, since two optical signals modulated by the mutual phase modulator 220 and the like have an opposite phase and the same phase, one side is intensified and the other side is weakened, and thereby, a shifted optical signal is finally output.

The branching unit 210c branches an output of the optical combiner 250 and the monitor 290 obtains output information. After the output information is obtained, a process of applying branched signals to the optical phase shifter 270 is illustrated in a flowchart of FIG. 5. In FIG. 4, a case where a notification is transmitted to the optical phase shifters 270a and 270b and control is performed is illustrated. However, in the flowchart of FIG. 5, either of the optical phase shifters 270a and 270b is controlled. Both of the optical phase shifters 270a and 270b may be also controlled. The notification may be transmitted to only one side.

If outputs are monitored, a value of 0 is stored at a flag, a phase shift quantity is stored at $\phi 1$, and an extinction ratio (extinction ratio of an original frequency and a shifted frequency) is stored at f1 (Steps S10, S11, and S12)

It is examined whether or not the extinction ratio f1 is greater than a predetermined value (Step S13). Since the extinction ratio after optical frequency shift is obtained when the extinction ratio f1 is greater than the predetermined value (Yes in Step S13), the optical frequency shift has been performed and thus the process is ended. When the extinction ratio f1 is equal to or smaller than the predetermined value (No in Step S13), $\phi 1$ is stored at $\phi$ (Step S14) and it is checked whether or not flag=1 is satisfied (flag=0) (Step S15). When flag=1 is satisfied (Yes in Step S15), ($\phi - \Delta \phi$) is stored at $\phi 1$. (Step S17). When flag=1 is not satisfied (No in Step S15), ($\phi + \Delta \phi$) is stored at $\phi 1$. (Step S16). Here, $\Delta \phi$ indicates an adjustment quantity of phase shift in the optical phase shifter 270.

After Step S16 and Step S17, the extinction ratio when the phase is adjusted is stored at f2 (Step S18) and the extinction ratios of f1 and f2 are compared to each other (Step S19). When f2 is greater than f1 (Yes in Step S19), f2 is stored at f1 (Step S21) and the process proceeds to Step S13. When f2 is equal to or smaller than f1 (No in Step S19), the flag is reversed (Step S20) and the process proceeds to Step S15. Regarding reversing of the flag, when the flag is "1", the flag is reversed to be "0", and when the flag is "0", the flag is reversed to be "1".

In this manner, the extinction ratio of the original frequency and the shifted frequency is greater than a predetermined value.

Changing of the delay quantity of the optical delay line 240 causes two frequency components generated through mutual phase modulation of the mutual phase modulator 220b to be changed and thus the extinction ratio of the two signals generated through the mutual phase modulation may be changed. Thus, the extinction ratio of two signals generated through mutual phase modulation performed by adjustment of the optical delay line 240 may be also adjusted so as to be equal to or greater than a predetermined value. The method thereof is illustrated in the flowchart of FIG. 6.

Figure 5:
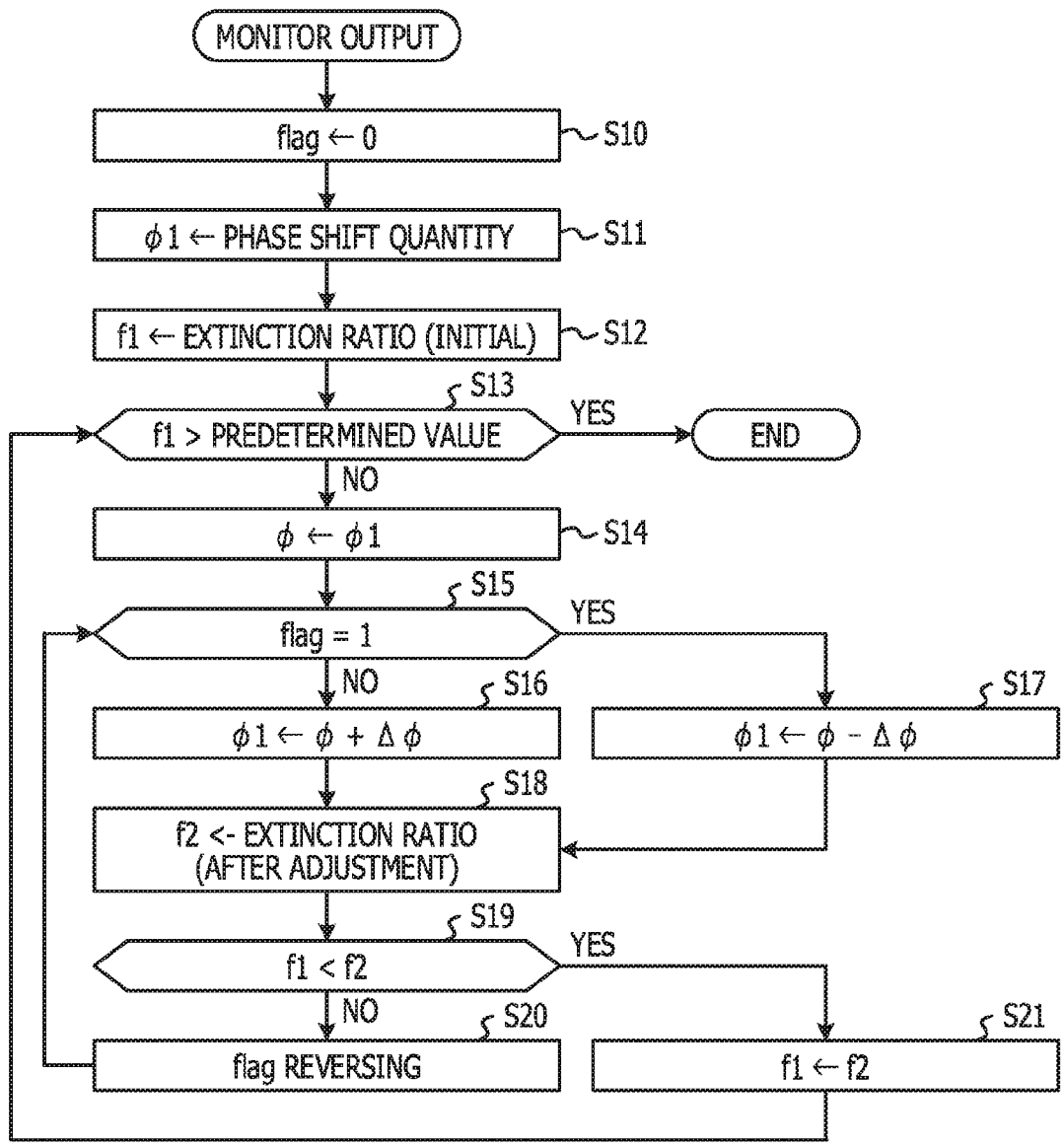
FIG. 5 is a diagram illustrating an example of a flowchart of adjusting an optical phase shifter using an output signal result from a monitor.
Figure 6:
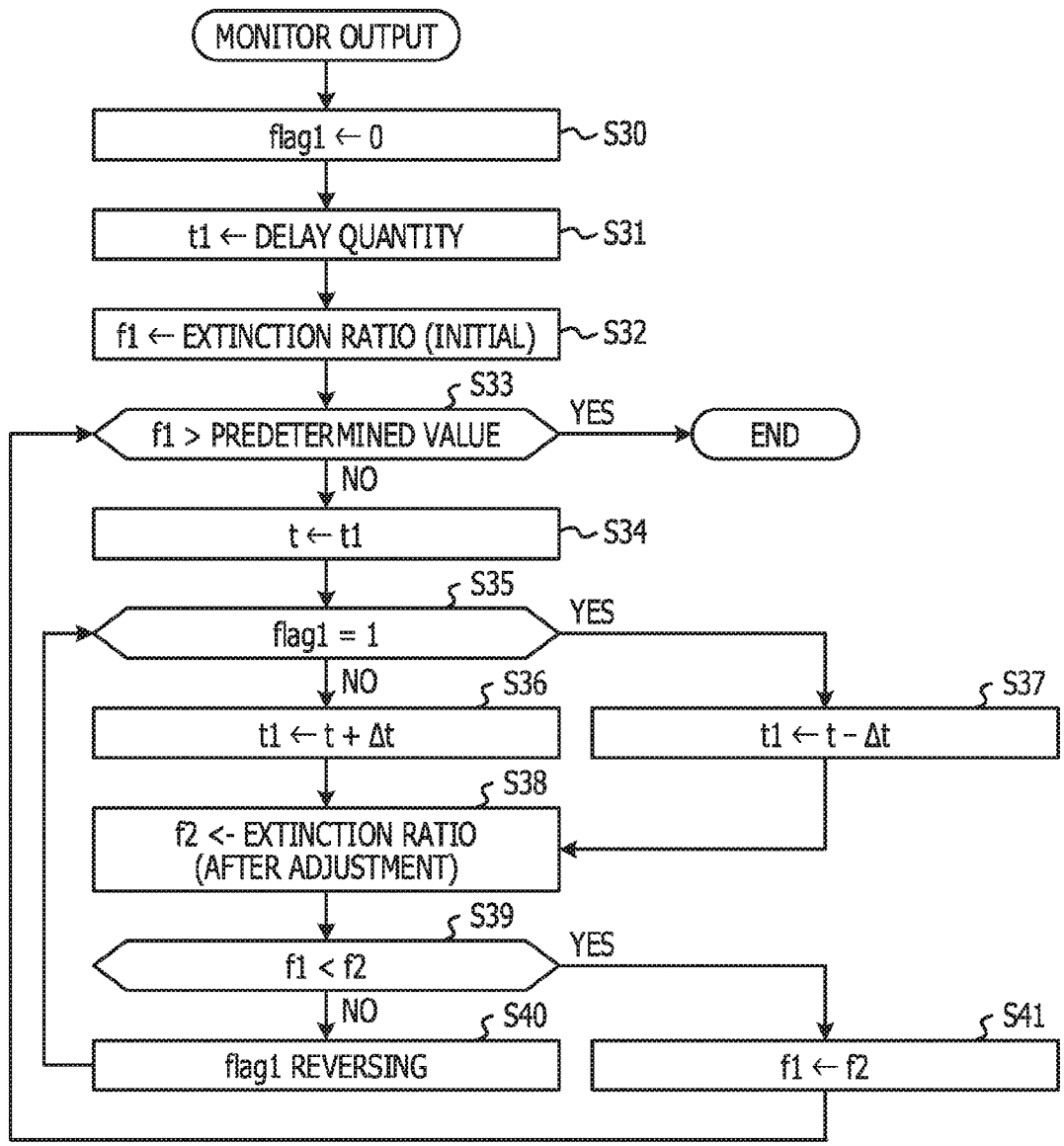
FIG. 6 is a diagram illustrating an example of a flowchart of adjusting a delay device using the output signal result from the monitor.

The flag and $\phi$ in FIG. 5 respectively correspond to a flag1 and t in the flowchart of FIG. 6. A value stored at t corresponds to the delay quantity. Other operations are similar to those in the flowchart of FIG. 5.

With the above descriptions, the monitor 290 monitors an output and thus the optical delay line 240 or the optical phase shifter 270 may perform adjustment and the extinction ratio may be held.

With the above descriptions, in Embodiment 2, optical frequency shift of a frequency interval may be performed by using the optical beat signal having a desired frequency interval. Accordingly, similarly to Embodiment 1, optical frequency shift of several THz can be performed by setting the frequency interval of the optical beat signal to several THz.

Embodiment 3

Figure 7:
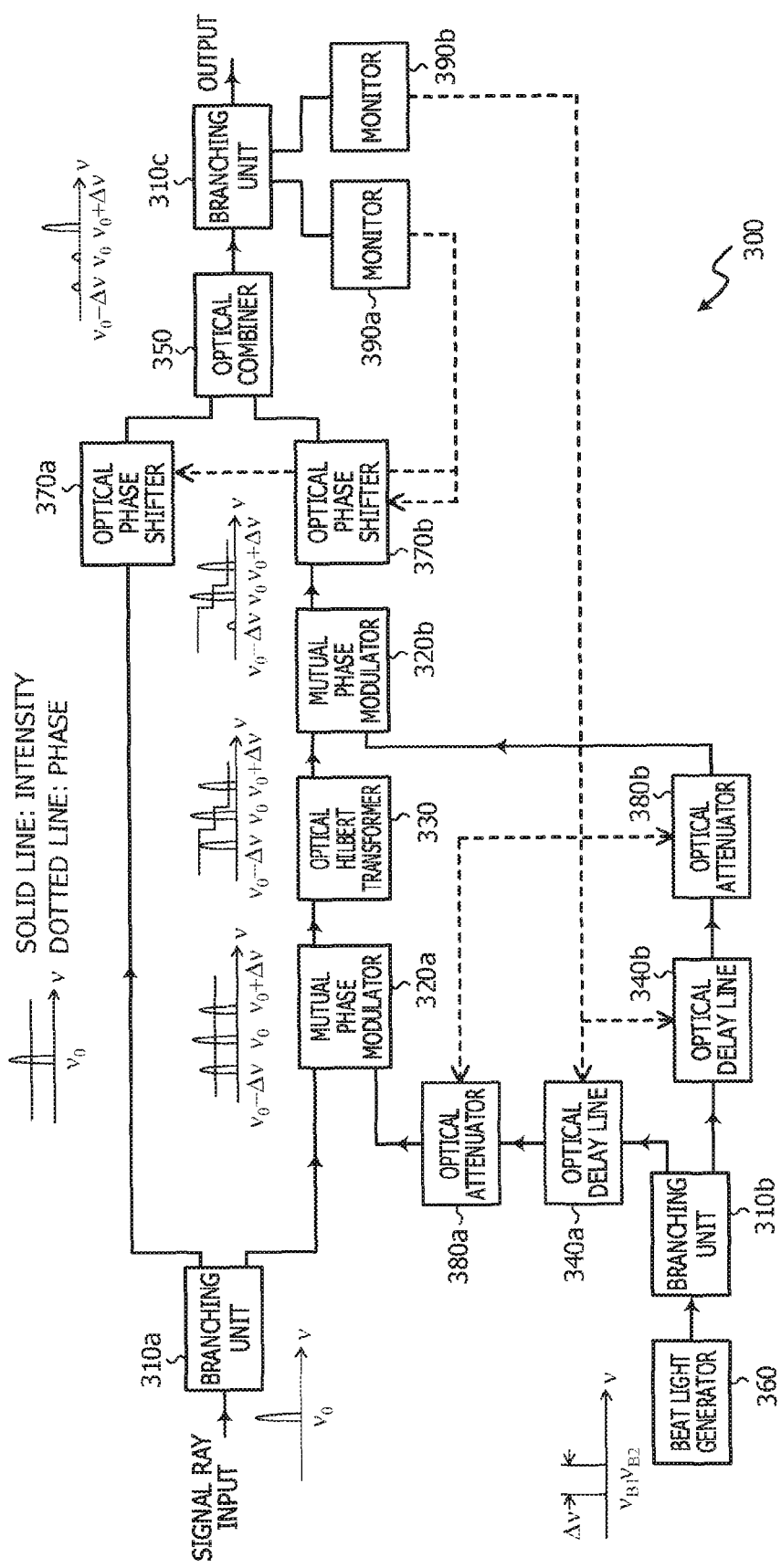
FIG. 7 is a diagram illustrating a configuration example of an optical frequency shifter according to Embodiment 3.

FIG. 7 illustrates a configuration diagram of an optical frequency shifter 300 according to Embodiment 3. The optical frequency shifter 300 according to Embodiment 3 includes branching units 310a, 310b, and 310c, mutual phase modulators 320a and 320b, an optical Hilbert transformer 330, optical delay lines 340a and 340b, an optical combiner 350, a beat light generator 360, optical phase shifters 370a and 370b, optical attenuators 380a and 380b, and monitors 390a and 390b. When distinction is not desired, descriptions are simply made by using only numbers. Regarding a signal status in the optical frequency shifter 300, intensity change is indicated by a solid line and phase change is indicated by a dotted line.

The branching units 310, the mutual phase modulators 320, the optical Hilbert transformer 330, the optical delay lines 340, the optical combiner 350, the beat light generator 360, the optical phase shifters 370, and the monitors 390 are respectively similar to those in Embodiment 1 or Embodiment 2.

The optical attenuator 380 attenuates optical intensity of an input optical signal.

In Embodiment 3, the processes from the branching unit 310a to the stage before signals are input to the optical combiner 350 are similar to those in Embodiment 1. Before signals are input to the optical combiner 350, optical signals are respectively input to the optical phase shifters 370, and outputs of the optical phase shifters 370 are input to the optical combiner 350. The branching unit 310c branches an optical signal output from the optical combiner 350, and an output status is confirmed by the monitor 390. At this time, the optical phase shifter 370, the optical delay line 340, and the optical attenuator 380 are adjusted in accordance with the output information.

For example, in a case where a phase difference when a signal having an original frequency component $v_0$ is combined by the optical combiner 350 is not obtained, this is confirmed by the monitor 390a and a notification thereof is transmitted to the optical phase shifter 370. The optical phase shifter 370 performs adjustment based on the notification, so as to have a phase difference to be removed. For example, processes having a flow similar to the flowchart in FIG. 5 are performed.

Output information of the frequency component (in FIG. 7, $v - \Delta v$) to be removed by the mutual phase modulator 320b is confirmed by the monitor 390b and a notification is transmitted to the optical delay line 340 and the optical attenuator 380. A phase or intensity of an optical beat signal input to the mutual phase modulator 320 is adjusted based on this notification.

A case where the two monitors 390 are provided is described. However, it is not limited thereto. For example, one monitor 390 may be provided and thus confirmation or notification may be collectively performed.

Figure 8:
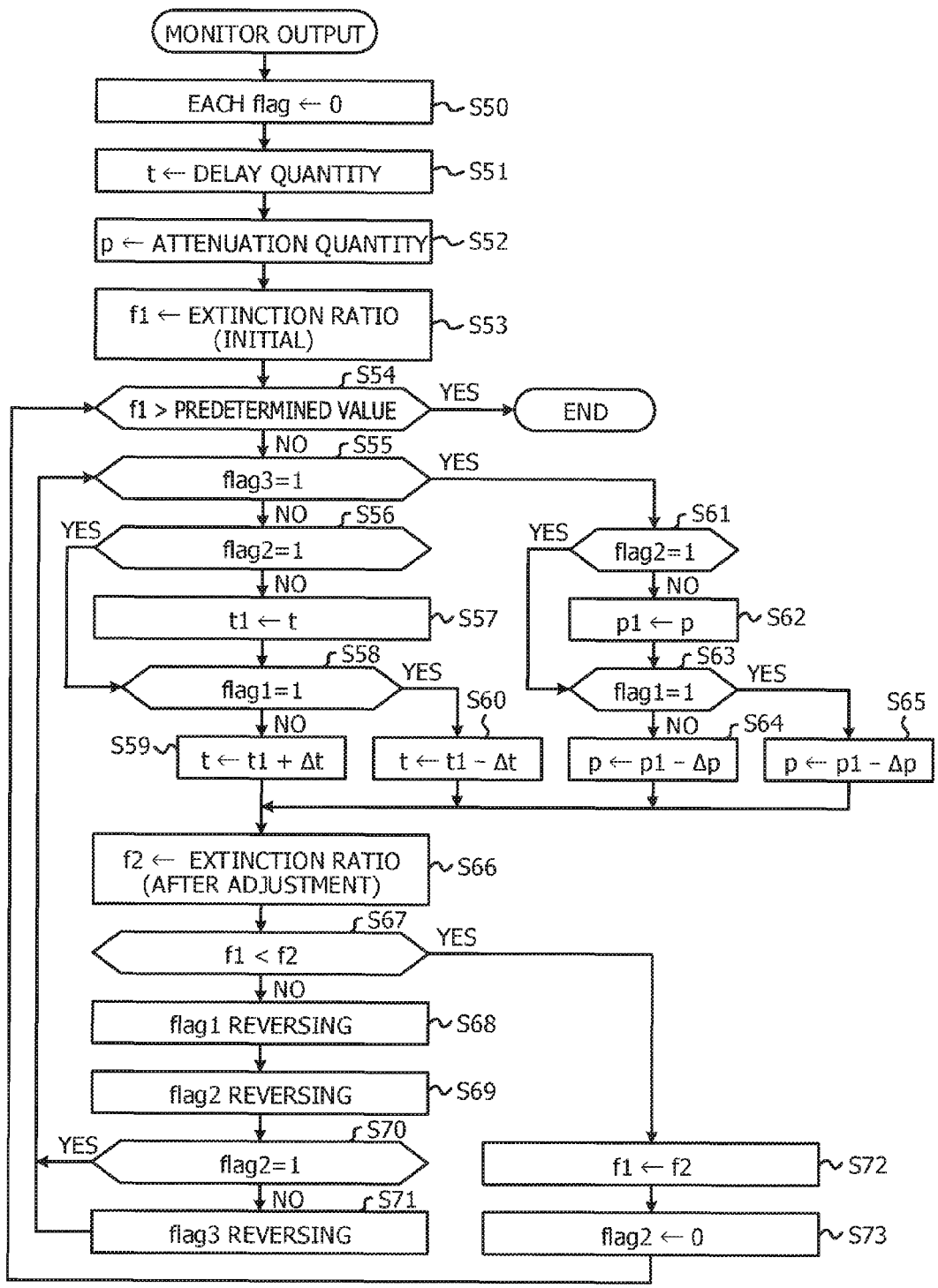
FIG. 8 is a diagram illustrating an example of a flowchart of adjusting an optical attenuator and the like according to Embodiment 3.

After the output information is obtained by the monitor, adjustment processing of the optical delay line and the optical attenuator is illustrated in the flowchart of FIG. 8.

The flowchart of FIG. 8 includes adjustment of a flag2, a flag3, and an attenuation quantity of the optical attenuator 380 in addition to the flowchart of FIG. 6. The flag2 indicates "1" when the extinction ratio becomes small by the previous adjustment. The flag3 is used in switching between the optical delay line 340 and the optical attenuator 380. When the flag3 indicates "1", the optical attenuator 380 performs adjustment.

A value of 0 is stored at each of the flags (flag1 to flag3), the delay quantity is stored at t, and the attenuation quantity is stored at p (Steps S50, S51, and S52). Then, the extinction ratio is stored at f1 (Step S53) and it is checked whether or f1 is greater than a predetermined extinction ratio (Step S54). When f1 is greater than the predetermined extinction ratio (Yes in Step S54), the process is ended. When f1 is equal to or smaller than the predetermined extinction ratio (No in Step S54), it is confirmed whether or not flag3=1 is satisfied (Step S55).

When flag3=1 is not satisfied (flag3=0) (No in Step S55), the process proceeds to Step S56. When flag3=1 is satisfied (Yes in Step S55), the process proceeds to Step S61.

In Step S56 and Step S61, it is checked whether or not flag2=1 is satisfied. When flag2=1 is not satisfied (flag2=0) (No in Step S56, Step S61), t is stored at t1 (Step S57) and p is stored at p1 (Step S62). The process proceeds to the next process.

When flag2=1 is satisfied (Yes in Step S56, Step S61) and before the processes of Step S57 and Step S62, it is confirmed whether or not flag1=1 is satisfied (Step S58, Step S63).

When flag1=1 is satisfied (Yes in Step S58), (t1−Δt) is stored at t (Step S60). When flag1=1 is not satisfied (flag1=0) (No in Step S58), (t1+Δt) is stored at t (Step S59).

When flag1=1 is satisfied (Yes in Step S63), (p1−Δp) is stored at p (Step S65). When flag1=1 is not satisfied (flag1=0) (No in Step S63), (p1+Δp) is stored at p (Step S64).

After the processes of Steps S59, S60, S64, and S65, the extinction ratio (extinction ratio at t and p after adjustment) is stored at f2 (Step S66) and it is checked whether or not the extinction ratio f2 is greater than the extinction ratio f1, by comparing the extinction ratios f1 and f2 (Step S67).

When f2 is greater than f1 (Yes in Step S67), the value of f2 is stored at f1 (Step S72), "0" is stored at the flag2 (Step S73), and the process proceeds to Step S54. When f2 is equal to or smaller than f1 (No in Step S67), the flag1 and the flag2 are reversed (Step S68, Step S69) and it is checked whether or not flag2=1 is satisfied (Step S70).

When flag2=1 is not satisfied (No in Step S70), the flag3 is reversed (Step S71), and the process proceeds to Step S55. When flag2=1 is satisfied (Yes in Step S70), the process proceeds to Step S55.

As described above, more extinction ratio may be obtained by adjusting the optical delay line 340 and the optical attenuator 380. In the flowchart of FIG. 8, only one optical delay line 340 and only one optical attenuator 380 are adjusted. However, when two optical delay lines and two optical attenuators are provided as illustrated in FIG. 7, the two optical delay lines and two optical attenuators may be adjusted. When optical delay lines and optical attenuators of three or more are provided, the optical delay lines and optical attenuators may be appropriately adjusted.

According to Embodiment 3, optical frequency shift of the frequency interval of the optical beat signal can be performed, and phase shift of several THz may be performed by using the frequency interval of several THz of the optical beat signal. Since a status of an output signal can be viewed by the monitor 390, optical phase shift may be performed with higher accuracy.

Embodiment 4

Figure 9:
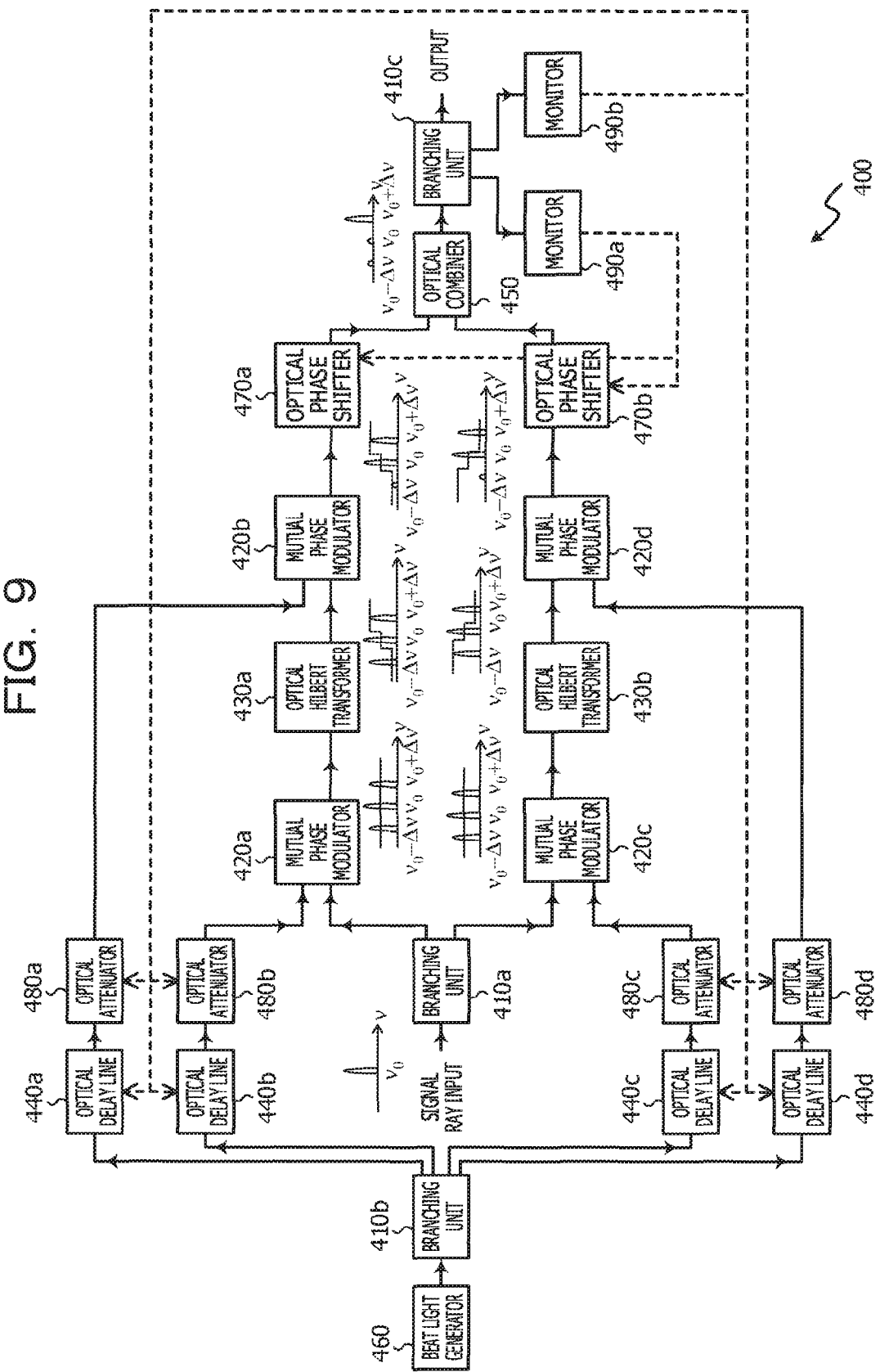
FIG. 9 is a diagram illustrating a configuration example of an optical frequency shifter according to Embodiment 4.

FIG. 9 illustrates a configuration diagram of an optical frequency shifter 400 according to Embodiment 4. The optical frequency shifter 400 according to Embodiment 4 includes branching units 410*a*, 410*b*, and 410*c*, mutual phase modulators 420*a*, 420*b*, 420*c*, and 420*d*, optical Hilbert transformers 430*a* and 430*b*, optical delay lines 440*a*, 440*b*, 440*c*, and 440*d*, an optical combiner 450, a beat light generator 460, optical phase shifters 470*a* and 470*b*, optical attenuators 480*a*, 480*b*, 480*c*, and 480*d*, monitors 490*a* and 490*b*. When distinction is not desired, descriptions are simply made by using only numbers.

The branching units 410, the mutual phase modulators 420, the optical Hilbert transformers 430, the optical delay lines 440, the optical combiner 450, the beat light generator 460, the optical phase shifters 470, the optical attenuators 480, and the monitors 490 are similar to those in Embodiments 1 to 3.

In a case of Embodiment 4, conversion is performed on both of optical signals which are obtained by the branching unit 410*a* branching an input optical signal, by using the mutual phase modulators 420 and the optical Hilbert transformers 430. The phase of one signal obtained by branching of the branching unit 410*a* is adjusted by the mutual phase modulator 420*a*, the optical Hilbert transformer 430*a*, the mutual phase modulator 420*b*, and the optical phase shifter 470*a* which performs processing. The signal having the adjusted phase is input to the optical combiner 450.

The phase of the other signal obtained by branching of the branching unit 410*a* is adjusted by the mutual phase modulator 420*c*, the optical Hilbert transformer 430*b*, the mutual phase modulator 420*d*, and the optical phase shifter 470*b* in which the signal flows. The signal having the adjusted phase is input to the optical combiner 450.

If two optical signals are input to the optical combiner 450, the two optical signals are multiplexed and a signal generated by multiplexing is output. If the signal which has been output is branched by the branching unit 410*c* and output, signals obtained by branching are respectively input to the monitors 490. The monitor 490*a* notifies the optical phase shifter 470 of an output result and the optical phase shifter 470 adjusts the phase.

The monitor 490*b* notifies the optical delay line 440 and the optical attenuator 480 of an output result and causes the optical delay line 440 and the optical attenuator 480 to be adjusted.

Frequency components generated by performing the mutual phase modulation and the Hilbert transform on a signal input to the optical combiner 450 have to have different phases. If the phase is the same when the signal is input, there is a probability of removing the frequency component simultaneously with a time when the original frequency component is removed. Thus, in order to suppress that the frequency component is removed simultaneously with removal of the original frequency component, it is desired that the signs (±) in phase change performed by the optical Hilbert transformers 430*a* and 430*b* are different from each other.

For example, as illustrated in FIG. 9, if $(v_0+\Delta v)$ is set to $\pi/2$ when an output of the optical Hilbert transformer 430*a* is greater than the reference frequency $v_0$ and $(v_0+\Delta v)$ is set to $-\pi/2$ when the output of the optical Hilbert transformer 430a is smaller than the reference frequency $v_0$, the output of the optical Hilbert transformer 430b is $-\pi/2$ when the output thereof is greater than the reference frequency $v_0$, and the output of the optical Hilbert transformer 430b is $\pi/2$ when the output thereof is smaller than the reference frequency $v_0$.

With the processes performed in this manner, regarding the original reference frequency $v_0$, two signals to be multiplexed have the same phase. Regarding the new frequency component (($v_0+\Delta v$) in FIG. 9), two optical signals have phases opposite to each other. Thus, if the optical combiner 450 performs multiplexing so as to weaken the original frequency component, the new frequency component (($v_0+\Delta v$) in FIG. 9) is intensified.

According to Embodiment 4, it is possible to intensify an optical signal having a frequency band which is desired to be output by the optical combiner 450, in addition to the effects similar to those in Embodiment 1. Since the original frequency component is weakened, it is possible to obtain a signal subjected to optical frequency shift having a high gain.

Embodiment 5

Figure 10:
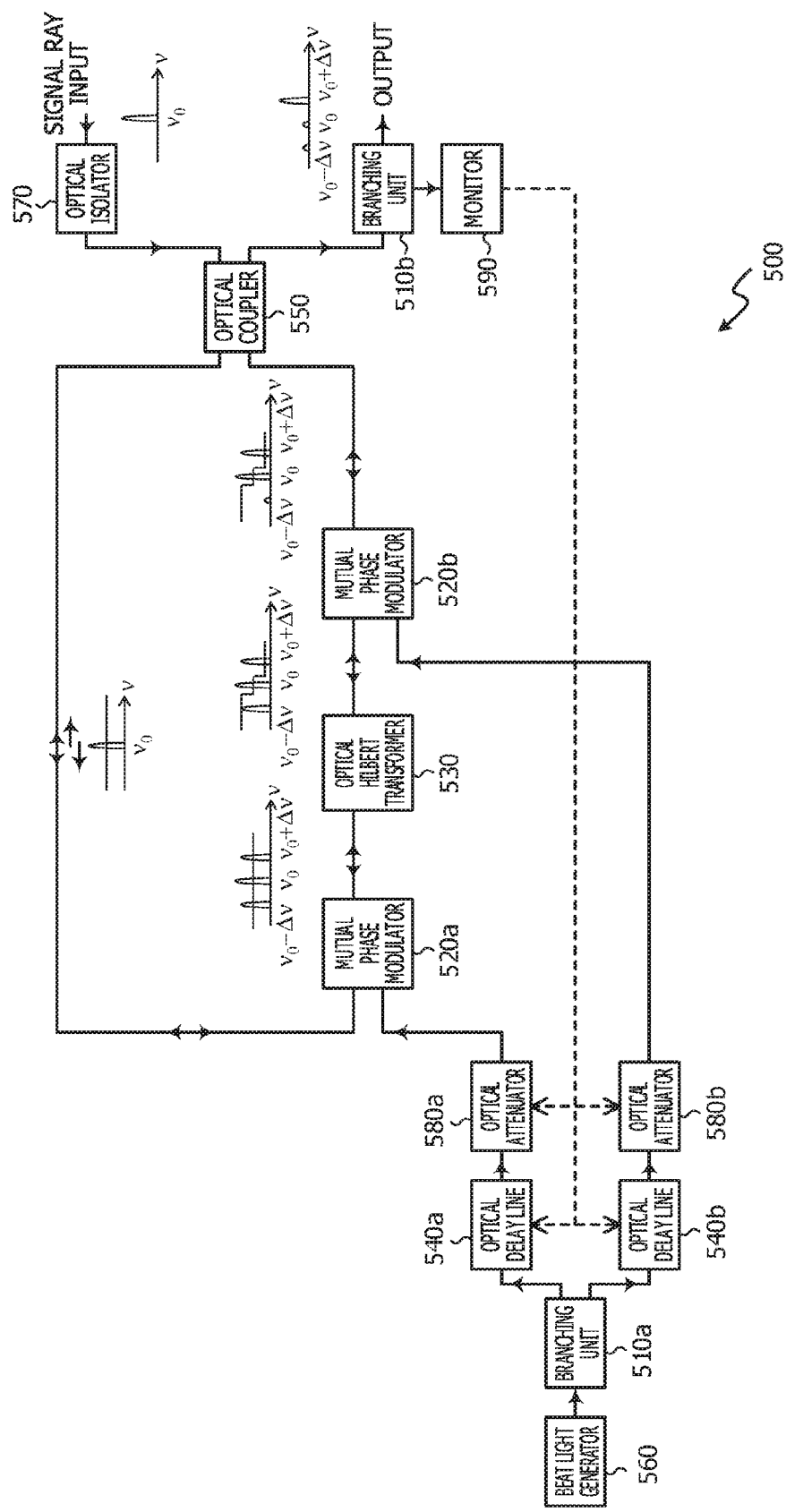
FIG. 10 is a diagram illustrating a configuration example of an optical frequency shifter according to Embodiment 5.

FIG. 10 illustrates a configuration diagram of Embodiment 5. The optical frequency shifter in Embodiments 1 to 4 is a Mach-Zehnder type. On the contrary, an optical frequency shifter in Embodiment 5 is a Sagnac type.

An optical frequency shifter 500 according to Embodiment 5 includes branching units 510a and 510b, mutual phase modulators 520a and 520b, an optical Hilbert transformer 530, optical delay lines 540a and 540b, an optical coupler 550, a beat light generator 560, an optical isolator 570, optical attenuators 580a and 580b, and a monitor 590. When distinction is not desired, descriptions are simply made by using only numbers.

The branching units 510, the mutual phase modulators 520, the optical Hilbert transformer 530, the optical delay lines 540, the beat light generator 560, and the optical attenuators 580 are respectively similar to those in Embodiments 1 to 4.

The optical isolator 570 outputs an optical signal which has been input to the optical coupler 550 and suppresses an input of an optical signal from the optical coupler 550.

The optical coupler 550 branches the optical signal input from the optical isolator 570. The optical coupler 550 performs multiplexing of two optical signals transferred from the mutual phase modulators 520a and 520b and outputs a result of multiplexing.

One optical signal by the optical coupler 550 branching an optical signal input from the optical isolator 570 is input to the mutual phase modulator 520a and is sequentially input to the optical Hilbert transformer 530 and the mutual phase modulator 520b. An optical beat signal is input in the same direction as a direction in which the one signal is input. Thus, the mutual phase modulators 520a and 520b perform mutual phase modulation on this optical signal.

The other optical signal is input to the mutual phase modulator 520b side and is sequentially input to the optical Hilbert transformer 530 and the mutual phase modulator 520a. The other optical signal is input in a direction different from that of the optical beat signal. Thus, the mutual phase modulators 520a and 520b do not perform mutual phase modulation on this optical signal.

The optical beat signal is input along with the optical signal input to the mutual phase modulator 520a. Thus, one optical signal and the other optical signal are multiplexed by the optical coupler 550, in a state where the one optical signal is subjected to mutual phase modulation and the other optical signal is not subjected to mutual phase modulation.

Because the other optical signal has only the original frequency component, even when the other optical signal is input to the optical Hilbert transformer 530, the other optical signal is output as the original optical signal in the optical Hilbert transformer 530.

According to Embodiment 5, effects equivalent to those in Embodiment 1 are obtained. Since the lengths of optical paths of the signals are equal to each other in comparison to Embodiment 1, the original frequency component $v_0$ is easily adjusted.

Embodiment 6

Figure 11:
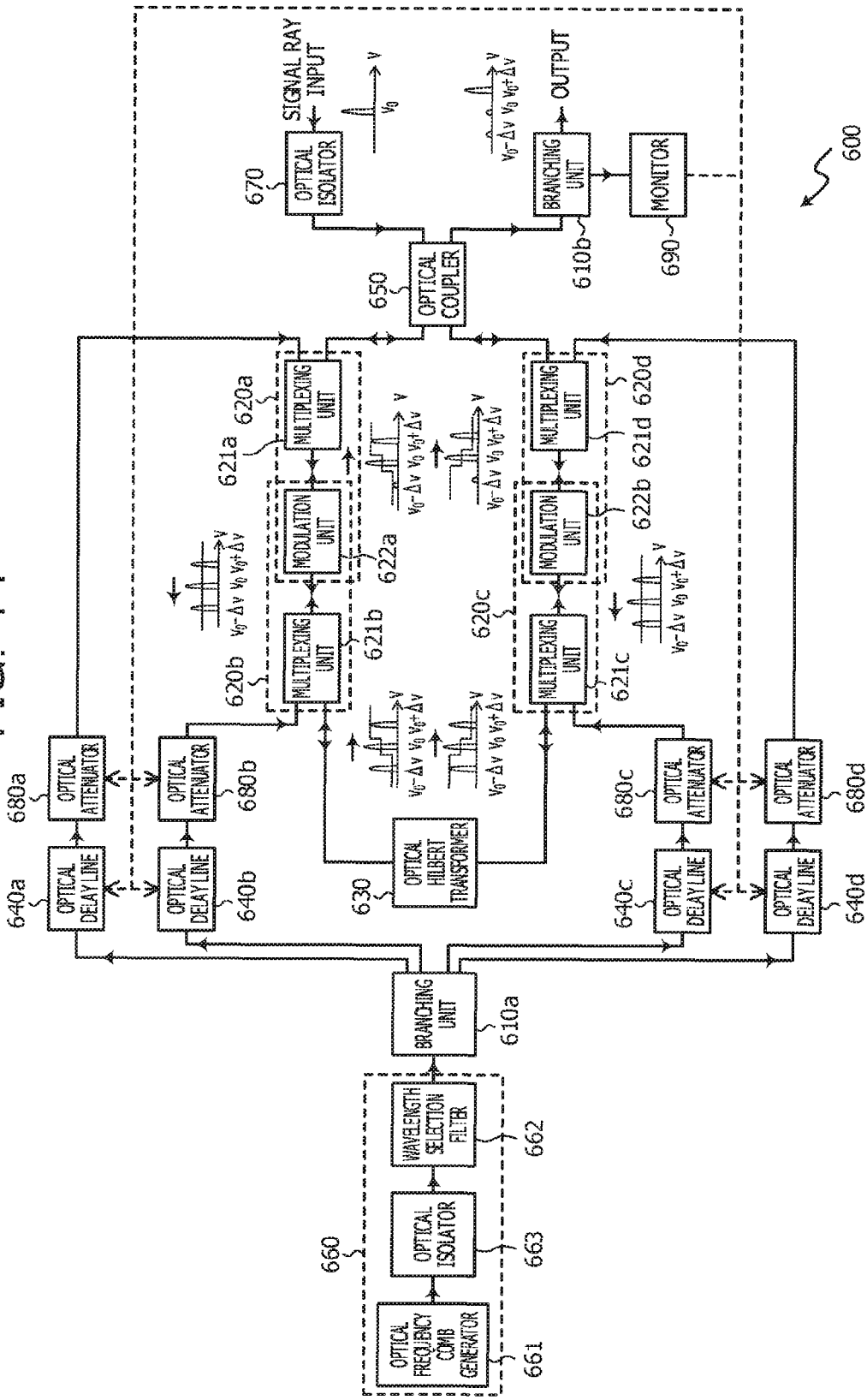
FIG. 11 is a diagram illustrating a configuration example of an optical frequency shifter according to Embodiment 6.

FIG. 11 is a configuration diagram of an optical frequency shifter 600 described in Embodiment 6. The optical frequency shifter 600 includes branching units 610a and 610b, mutual phase modulators 620a, 620b, 620c, and 620d, an optical Hilbert transformer 630, optical delay lines 640a, 640b, 640c, and 640d, an optical coupler 650, a beat light generator 660, an optical isolator 670, an optical attenuators 680a, 680b, 680c, and 680d, and a monitor 690. When distinction is not desired, descriptions are simply made by using only numbers.

The branching units 610, the mutual phase modulators 620, the optical Hilbert transformer 630, the optical delay lines 640, the optical coupler 650, the optical isolator 670, the optical attenuators 680, and the monitor 690 are respectively similar to those in Embodiments 1 to 5.

An optical frequency comb generator 661 and a wavelength selection filter 662 which are included in the beat light generator 660 are similar to the optical frequency comb generator 161 and the wavelength selection filter 162. The beat light generator 660 includes an optical isolator 663 in addition to the optical frequency comb generator 661 and the wavelength selection filter 662.

The optical isolator 663 is used for reducing a wraparound signal from the multiplexing unit 621.

The branching unit 610a performs branching by 1×4.

The mutual phase modulator 620a includes a multiplexing unit 621a and a modulation unit 622a. The mutual phase modulator 620b includes a multiplexing unit 621b and the modulation unit 622a. The mutual phase modulator 620c includes a multiplexing unit 621c and a modulation unit 622b. The mutual phase modulator 620d includes a multiplexing unit 621d and the modulation unit 622b.

In this manner, the modulation unit 622 is used in the two mutual phase modulators 620.

In Embodiment 6, if an optical signal is input, the optical coupler 650 branches the input optical signal into two signals. One signal among the optical signals obtained by division of the optical coupler 650 is input to the multiplexing unit 621a of the mutual phase modulator 620a. A signal subjected to mutual phase modulation by the mutual phase modulator 620a is subjected to Hilbert transform by the optical Hilbert transformer 630. Then, a signal obtained by Hilbert transform is subjected to mutual phase modulation by the mutual phase modulator 620c and is input to the coupler 650.

Another signal among the optical signals obtained by division of the optical coupler 650 is input to the multiplexing unit 621d of the mutual phase modulator 620d. A signal subjected to mutual phase modulation by the mutual phase modulator 620d is subjected to Hilbert transform by the optical Hilbert transformer 630. Then, a signal obtained by Hilbert transform is subjected to mutual phase modulation by the mutual phase modulator 620b and is input to the coupler 650.

In the optical Hilbert transformer 630, regarding a signal modulated by the mutual phase modulator 620a and a signal modulated by the mutual phase modulator 620d, the original frequency has characteristics opposite to the original characteristics. For example, phase shift of $-\pi/2$ is applied to a frequency component ($v_0+\Delta v$) which is greater than the original frequency component $v_0$ among components modulated by the mutual phase modulator 620a. Phase shift of $\pi/2$ is applied to a frequency component ($v_0+\Delta v$) which is greater than the original frequency component $v_0$ among components modulated by the mutual phase modulator 620d.

Two signals input to the optical coupler 650 are multiplexed and output to the branching unit 610b. The branching unit 610b branches an input signal. One signal obtained by branching is transferred as an output and the other signal is transferred to the monitor 690.

The monitor 690 confirms the output and notifies the optical delay line 640 and the optical attenuator 680 of the output. The optical delay line 640 and the optical attenuator 680 adjust an optical beat signal which is to be input to the mutual phase modulator 620 in accordance with information in the notification.

According to Embodiment 6, it is possible to intensify a signal having a frequency band which is desired to be output by the optical coupler 650, in addition to the effects similar to those in Embodiment 1. Since the original frequency component is weakened, it is possible to obtain a signal subjected to optical frequency shift having a high extinction ratio.

The configuration in which non-linear optical elements or Hilbert transformers of the small number are provided in comparison to the Mach-Zehnder type (Embodiment 4) is made.

Embodiment 7

Figure 12:
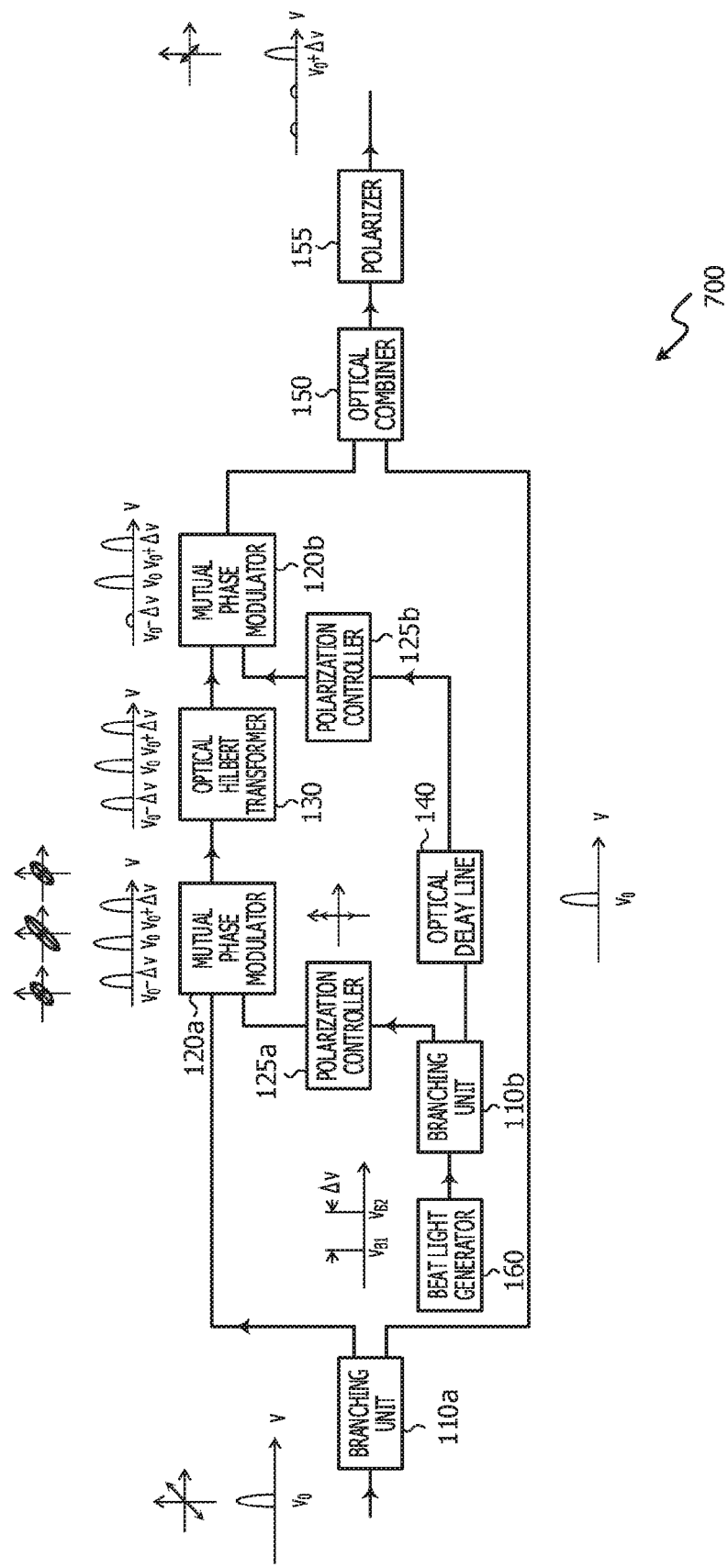
FIG. 12 is a diagram illustrating a configuration example of an optical frequency shifter according to Embodiment 7.

FIG. 12 illustrates a configuration diagram of an optical frequency shifter 700 according to Embodiment 7. The optical frequency shifter 700 according to Embodiment 7 includes a polarization controller 125 and a polarizer 155 in addition to the branching unit 110, the mutual phase modulator 120, the optical Hilbert transformer 130, the optical delay line 140, the optical combiner 150, and the beat light generator 160 which are components of Embodiment 1.

The polarization controller 125 controls a polarization state of an optical beat signal. For example, the polarization controller 125 controls the input optical signal so as to be changed to a linear polarized wave which is shifted from the polarization state of the input optical signal by 45°.

The polarizer 155 has a main axis which causes a specific polarized wave to pass through the main axis. For example, the polarizer 155 has the main axis which causes a polarized wave obtained by shifting the polarized wave of the input optical signal by 90°, to pass through the main axis.

In Embodiment 7, the mutual phase modulator 120a performs mutual phase modulation on one optical signal and an optical beat signal. The one optical signal is obtained by the branching unit 110a branching the input optical signal which has the polarization state, and the optical beat signal is obtained by the polarization controller 125a applying the polarization state to the input optical signal. The optical Hilbert transformer 130 performs Hilbert transform on an output of the mutual phase modulator 120a.

The mutual phase modulator 120b performs mutual phase modulation on an output from the optical Hilbert transformer 130 and the optical beat signal obtained by the polarization controller 125b shifting the polarization state of the input optical signal. The optical combiner 150 performs multiplexing of a signal obtained by mutual phase modulation and the other optical signal obtained by branching of the branching unit 110a. A signal obtained by multiplexing passes through the polarizer 155 and then is output.

As a transition of the polarization state, for example, if the polarization state of the input optical signal is 45°, the polarization controller 125 applies the polarization state of 90° to the optical beat signal (linear polarization state shifted from the input optical signal by 45°).

An output of the mutual phase modulator 120a is subjected to mutual phase modulation in the polarization state (45°) of the input optical signal and the polarization state (90°) of the optical beat signal, and thereby a polarized wave component of 135° orthogonal to the input optical signal is generated. Thus, an optical signal subjected to elliptic modulation is output. At this time, ellipticity calculated from a long side (45° component in FIG. 12) of an ellipse and a short side (135° component in FIG. 12) varies depending on the frequency components ($v_0-\Delta v$, $v_0$, $v_0+\Delta v$).

An optical signal input to the optical combiner 150 in a state of such elliptic polarization is input in a state of elliptic change. An optical signal output from the optical combiner 150 is input to the polarizer 155 in a state of elliptically-polarized optical signal. If the polarizer 155 has a main axis which causes a polarized wave obtained by performing shift of 90° on the polarized wave of the input optical signal to pass through the main axis, only a polarized wave component orthogonal to the input optical signal may pass through the main axis among frequency components of the elliptically-polarized optical signal input to the polarizer 155.

Regarding an output of the polarizer 155, the frequency component $v_0$ of the input optical signal and the frequency component ($v_0+\Delta v$) of an optical signal obtained by optical frequency shift are different from each other in ellipticity, and the frequency component $v_0$ of the input optical signal having a long side is suppressed.

According to Embodiment 7, optical frequency shift is performed in consideration of the polarization state by using the polarization controller 125 and the polarizer 155, and thus the frequency component of the input optical signal can be suppressed more than that in a case where the polarized wave is not used.

Particularly, Embodiment 7 is effective when an interferometer is incomplete.

A method using the polarization state in Embodiment 1 is described. However, the method may be used in Embodiments 2 to 6.

Embodiment 8

Figure 13:
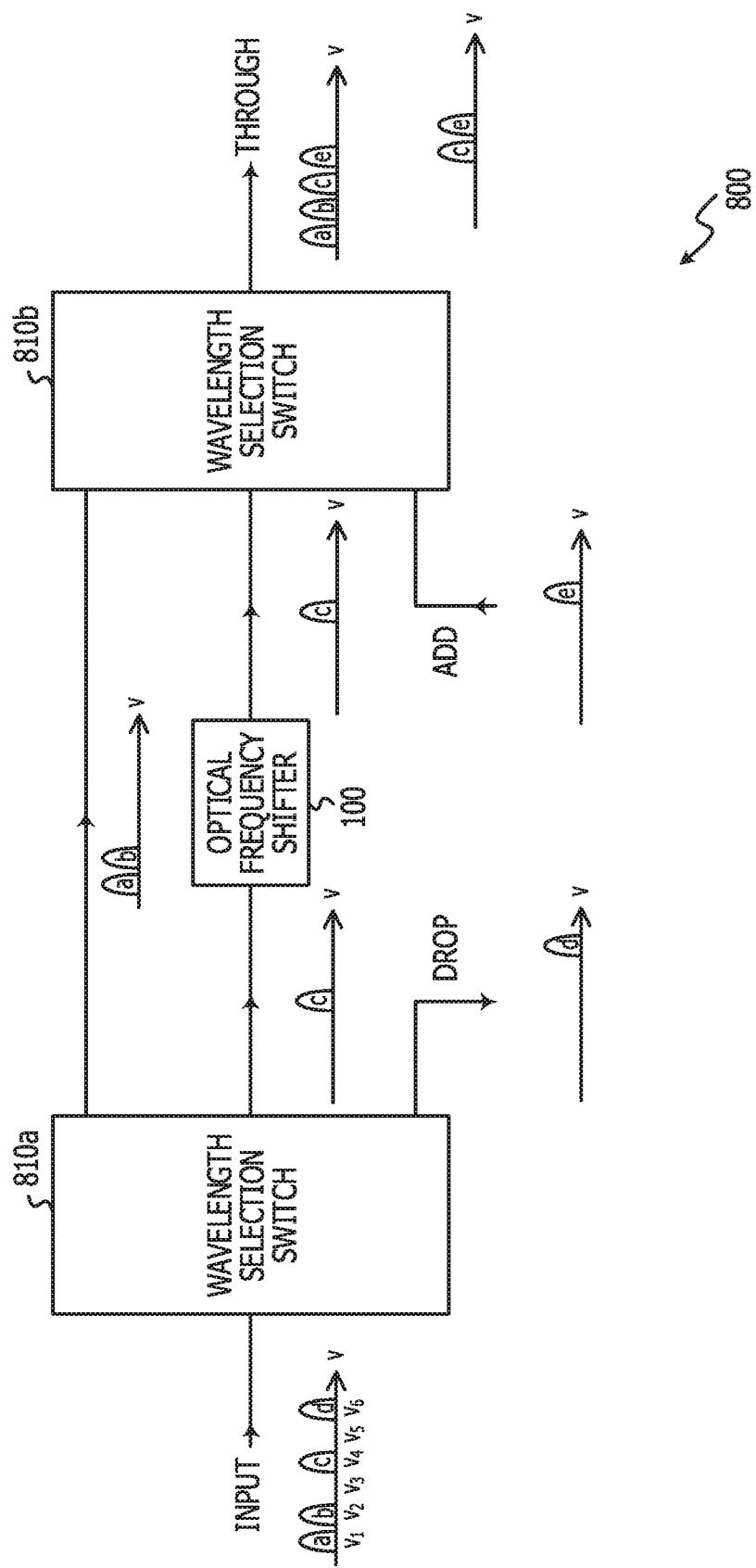
FIG. 13 is a diagram illustrating a configuration example of a light insertion and branch apparatus according to Embodiment 8.
Figure 14:
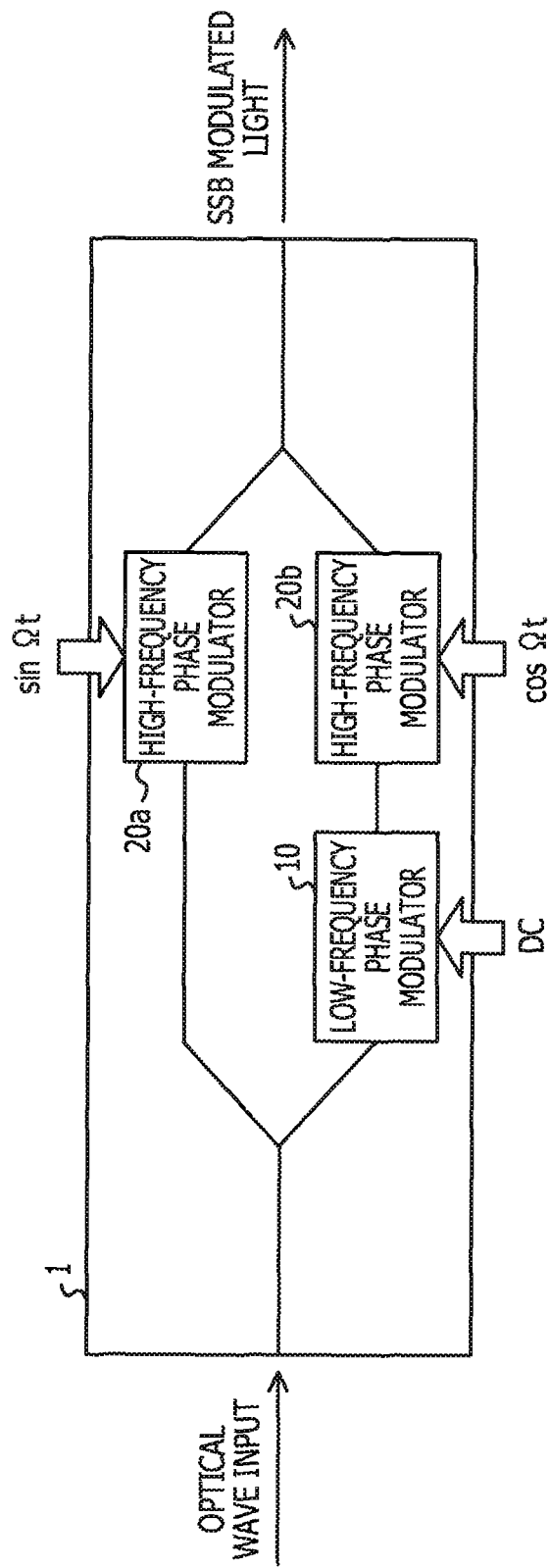
FIG. 14 is a diagram illustrating an SSB modulator of the related art.

In Embodiment 8, the optical frequency shifter 100 is used in a light insertion and branch apparatus. FIG. 13 illustrates a configuration diagram of a light insertion and branch apparatus 800 using the optical frequency shifter 100.

The light insertion and branch apparatus 800 according to Embodiment 8 includes wavelength selection switches 810a and 810b, and the optical frequency shifter 100. The wavelength selection switch 810 is described with only the number when distinction is not desired.

If a WDM signal is input, the wavelength selection switch 810a divides the input WDM signal into a drop wavelength, a frequency conversion wavelength, and a transmitted wavelength. The frequency conversion wavelength is converted into a desired optical frequency by using the optical frequency shifter 100. The converted signal is multiplexed to the transmitted wavelength along with a wave added by the wavelength selection switch 810b.

According to Embodiment 8, the optical frequency shifter 100 is provided in the light insertion and branch apparatus 800 and thus the optical frequency shifter 100 can perform optical frequency shift between adding and dropping. Thus, it is possible to efficiently use a multiple band. The light insertion and branch apparatus 800 according to Embodiment 8 uses the optical frequency shifter 100 according to Embodiment 1. However, the light insertion and branch apparatus 800 may use the optical frequency shifter 200 and the like according to Embodiments 2 to 7.

In the optical frequency shifter described in Embodiments 1 to 7, the units of the mutual phase modulation, the Hilbert transform, and the mutual phase modulation performed by using the optical beat signal may be also used as a single sideband modulator.

As described above, the most preferred embodiments and the like for a communication module are described. However, the embodiments are not limited to the above descriptions. Various modifications or changes based on the gist of the invention described in the claims or disclosed in the detailed descriptions of the embodiments for the invention may be applied by the person skilled in the art. Such modifications or changes may be included in the range of the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical frequency shifter comprising:
   a splitter configured to branch a first optical signal having a first frequency component;
   a first mutual phase modulator configured to generate a second optical signal having a second frequency component and a third optical signal having a third frequency component with mutual phase modulation of the first optical signal and a first optical beat signal having a desired frequency interval;
   a first phase converter configured to change a phase of an output of the first mutual phase modulator so as to be different from the second optical signal and the third optical signal;
   a second mutual phase modulator configured to generate the second optical signal and the third optical signal with mutual phase modulation of an output signal of the first phase converter and a second optical beat signal having a desired frequency interval; and
   a combiner configured to interfere between an output of the second mutual phase modulator and another optical signal obtained by branching of the splitter.

2. The optical frequency shifter according to claim 1, further comprising:
   a third mutual phase modulator configured to generate the second optical signal and the third optical signal with mutual phase modulation on a branched signal, other than the first optical signal, branched by the splitter and the first optical beat signal;
   a second phase converter configured to change a phase of an output of the third mutual phase modulator so as to be different from the second optical signal and the third optical signal; and
   a fourth mutual phase modulator configured to generate the second optical signal and the third optical signal with mutual phase modulation of an output signal of the second phase converter and the second optical beat signal,
   wherein the first phase converter and the second phase converter have different characteristics from each other.

3. The optical frequency shifter according to claim 1, wherein
   the third optical signal is weakened by phase change of the first converter and the second beat light used in the second mutual phase modulator.

4. The optical frequency shifter according to claim 1, wherein
   the first converter performs Hilbert transform by using the first optical signal as a reference.

5. The optical frequency shifter according to claim 1, further comprising:
   a delay line configured to generated the second optical beat signal by changing a phase of the first optical beat signal.

6. The optical frequency shifter according to claim 5, further comprising:
   a phase shifter configured to adjustment on optical phase of optical signal to be input to the combiner, before an input to the combiner.

7. The optical frequency shifter according to claim 6, further comprising:
   a monitor configured to confirm an output result from the combiner,
   wherein the monitor transmits a notification to at least one of the phase shifter and the delay line based on a confirmation result, and
   the phase shifter or the delay line that has been received the notification performs adjustment based on the received notification.

8. The optical frequency shifter according to claim 1, further comprising:
   an optical beat signal generator configured to generate an optical beat signal,
   wherein the optical beat signal generator extracts two desired optical frequencies from an optical frequency comb generated from the optical frequency comb generator that generates an optical frequency comb with a desired optical frequency difference, and generates the first optical beat signal.

9. The optical frequency shifter according to claims 1, wherein
   the first mutual phase modulator performs multiplexing of the first optical signal and the first optical beat signal, and modulates a result obtained by multiplexing of the first optical signal and the first optical beat signal, by using a nonlinear optical effect.

10. The optical frequency shifter according to claim 1, further comprising:
    a polarization controller configured to control the first optical beat signal so as to have a polarization state different from the first optical signal; and
    a polarizer configured to pass a main axis for causing a polarized wave which has a polarization state different from that of the first optical signal.

11. An optical frequency shifter comprising: a splitter configured to branch a first optical signal having a first frequency component; a first mutual phase modulator configured to generate a second optical signal having a second frequency component and a third optical signal having a third frequency component with mutual phase modulation of the first optical signal and a first optical beat signal having a desired frequency interval; a phase converter configured to change a phase of an output of the first mutual phase modulator so as to be different from the second optical signal and the third optical signal; a second mutual phase modulator configured to generate the second optical signal and the third optical signal with mutual phase modulation on a branched signal, other than the first optical signal₁ branched by the splitter and a second optical beat signal having a desired frequency interval; and a combiner configured to interfere between an output of the second mutual phase modulator and an output of the phase converter.

12. An optical insertion and branch apparatus which performs separation or mixing in accordance with a wavelength, the apparatus comprising:
  a first wavelength selection switch configured to separate a plurality of wavelength-multiplexed optical signal in accordance with a wavelength;
  a frequency shifter configured to convert of frequency on the signal having a wavelength branched as the optical signal which is subjected to wavelength conversion by the first wavelength selection switch; and
  a second wavelength selection switch configured to multiplex of a signal having a frequency band changed by the frequency shifter and a signal having another wavelength band,
  wherein the frequency shifter includes a splitter configured to branch a first optical signal having a first frequency component;
a first mutual phase modulator configured to generate a second optical signal having a second frequency component and a third optical signal having a third frequency component with mutual phase modulation of the first optical signal and a first optical beat signal having a desired frequency interval;
a first phase converter configured to change a phase of an output of the first mutual phase modulator so as to be different from the second optical signal and the third optical signal;
a second mutual phase modulator configured to generate the second optical signal and the third optical signal with mutual phase modulation of an output signal of the first phase converter and a second optical beat signal having a desired frequency interval; and
a combiner configured to interfere between an output of the second mutual phase modulator and another optical signal obtained by branching of the splitter.

13. The optical frequency shifter according to claim 1, further comprising:
  a polarization controller configured to control the first optical beat signal so as to have a polarization state different from the first optical signal.

14. The optical frequency shifter according to claim 1, further comprising:
  a polarizer configured to pass a main axis for causing a polarized wave which has a polarization state different from that of the first optical signal.

* * * * *